US009277413B2

(12) United States Patent
Kathuria et al.

(10) Patent No.: US 9,277,413 B2
(45) Date of Patent: Mar. 1, 2016

(54) COOPERATIVE COGNITIVE RADIO SPECTRUM SENSING USING A HYBRID DATA-DECISION METHOD

(71) Applicant: King Fahd University of Petroleum and Minerals, Dhahran (SA)

(72) Inventors: Humayun Khalid Kathuria, Dhahran (SA); Mohamed Deriche, Dhahran (SA); Wessam Ali Mesbah, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 22 days.

(21) Appl. No.: 14/137,093

(22) Filed: Dec. 20, 2013

(65) Prior Publication Data

US 2015/0181436 A1 Jun. 25, 2015

(51) Int. Cl.
*H04W 72/00* (2009.01)
*H04W 16/14* (2009.01)

(52) U.S. Cl.
CPC ..................................... *H04W 16/14* (2013.01)

(58) Field of Classification Search
USPC ............... 455/450, 451, 452.1, 454, 455, 448
See application file for complete search history.

(56) References Cited

U.S. PATENT DOCUMENTS

2008/0261639 A1* 10/2008 Sun et al. ...................... 455/515
2012/0195212 A1* 8/2012 Zhang et al. .................. 370/252
2012/0289236 A1* 11/2012 Xu et al. ........................ 455/446
2013/0273833 A1* 10/2013 Wang et al. ....................... 455/7
2014/0211644 A1* 7/2014 Giannakis et al. ............ 370/252

FOREIGN PATENT DOCUMENTS

CN          101834630 A       9/2010
CN          101944961 1 A     1/2011

OTHER PUBLICATIONS

Shaoyi Xu and Yanlei Shang, "Double Thresholds Based Cooperative Spectrum Sensing Against Untrusted Secondary Users in Cognitive Radio Networks", Vehicular Technology Conference, 2009. VTC Spring 2009. IEEE 69th.

* cited by examiner

*Primary Examiner* — Fayyaz Alam
(74) *Attorney, Agent, or Firm* — Oblon, McClelland, Maier & Neustadt, L.L.P.

(57) ABSTRACT

A spectrum sensing method for cognitive radio to detect spectrum holes in an environment of bandwidth scarcity. The method comprises first receiving a wireless signal at a cognitive radio user, and then discovering the frequency edges of allocated frequency bands by using wavelet transform coefficients to detect discontinuities in the power spectral density of the received signal. After determining the allocated frequency bands, the method determines frequency band availability by detecting the in band energy using a bi-threshold energy detector, where the energy detector makes hard decisions and soft decisions. Finally, a fusion center combines hard and soft decisions collected from a cooperative spectrum sensing network of cognitive radio users and makes a final decision using a hybrid of data fusion and decision fusion to determine the final decision regarding spectrum availability.

5 Claims, 27 Drawing Sheets

COOPERATIVE COGNITIVE RADIO SPECTRUM SENSING USING A HYBRID DATA-DECISION METHOD

CROSS-REFERENCE TO RELATED APPLICATIONS

The application titled "Cognitive radio spectrum sensing with improved edge detection of frequency bands", U.S. patent application Ser. No. 14/136,239, is incorporated herein by reference.

BACKGROUND

1. Field of the Disclosure

The present invention relates generally to cognitive radios, and more particularly to spectrum-sensing cognitive radios.

2. Description of the Related Art

With the advent of commercial wireless devices, we are witnessing a continuous demand for larger bandwidths from different multimedia services. So much so, that the current situation of commercial spectrum does not allow for new wireless systems. On the other hand, the spectrum bands already assigned to certain services are not constantly utilized by the primary (licensed) users. It is this situation which attracted the attention of researchers from around the world towards Cognitive Radio and Spectrum Sensing.

Cognitive radio is seen as an excellent solution to the problem of spectrum scarcity by efficient utilization of the radio spectrum. In order to achieve that, the Cognitive Radio approach makes nodes aware of their environment, and parameters are modified in real-time, based on the predicted situation of the targeted frequency bands. In this way, the foremost operation of a Cognitive Radio is to sense the targeted spectrum, and then make a decision on the availability of spectrum so that secondary users can benefit from it. Note that the spectrum sensing operation is a very challenging task and needs to be accurate and efficient in order to enable the Cognitive Radio system to work effectively.

Traditional wireless systems operate under the policy of static spectrum allocation. Once a wireless service provider gets a license for using a certain band from the commercially available spectrum for a particular geographic location, he and only himself has the right to operate in that frequency band no matter whether he wants to use it 100% of the time or only 10% of the time. Any unlicensed user is prohibited to benefit from the licensed frequency band. As the trend of wireless services is shifting from voice-only to multimedia services, e.g., mobile TV, the service providers are demanding higher and higher bandwidths. Realizing the fact that the spectrum band is a limited resource, society is at the verge of spectrum unavailability for new wireless systems. In addition to this problem, a more disappointing note published in a FCC survey report pointed out that the spectrum utilization in the 0-6 GHz band varies from 15% to 85%, meaning that the actual licensed spectrum is mostly underutilized in vast temporal and geographical dimensions, as discussed in FCC, "Spectrum Policy Task Force Report," *ET Docket,* 2002, herein incorporated by reference in its entirety. Hence, this inefficient utilization of licensed spectrum can be thought of as the outcome of wasteful static spectrum allocation. In order to solve the problems of spectrum scarcity and inefficient utilization, both researchers and policy makers got attracted to the recently introduced concept of cognitive radio, which was originally discussed in J. Mitola and G. Q. Maguire, "Cognitive radio: making software radios more personal," *IEEE Personal Communications,* vol. 6, no. 4, pp. 13-18, 1999, herein incorporated by reference in its entirety. Recently, the IEEE 802.22 cognitive radio wireless regional area network (WRAN) standard was introduced as the first effort towards the practical use of cognitive radio, as discussed in C. Stevenson, G. Chouinard, S. Shellhammer, and W. Caldwell, "IEEE 802.22: The first cognitive radio wireless regional area network standard," *IEEE Communications Magazine,* vol. 47, no. 1, pp. 130-138, January 2009, herein incorporated by reference in its entirety.

Cognitive radio is an intelligent wireless communication system that is aware of its surrounding environment (i.e., outside world), and uses the methodology of understanding-by-building to learn from the environment and adapt its internal states to statistical variations in the incoming RF stimuli by making corresponding changes in certain operating parameters (e.g., transmit-power, carrier-frequency, and modulation strategy) in real-time, with two primary objectives in mind: 1) highly reliable communications whenever and wherever needed; 2) efficient utilization of the radio spectrum.

In effect, the whole operation of a cognitive radio can be represented graphically as a cycle, the so called cognitive cycle, as show in FIG. 17.

The concept of a cognitive radio (CR) network has been efficiently explained in S. Haykin, "Cognitive radio: brain-empowered wireless communications," *IEEE Journal on Selected Areas in Communications,* vol. 23, no. 2, pp. 201-220, February 2005, incorporated herein by reference in its entirety, and in I. F. Akyildiz, W.-Y. Lee, M. C. Vuran, and S. Mohanty, "NeXt generation/dynamic spectrum access/cognitive radio wireless networks: A survey," *Computer Networks,* vol. 50, no. 13, pp. 2127-2159, September 2006, incorporated herein by reference in its entirety. This intelligent radio has the cognitive capability to sense its surrounding environment, and to determine appropriate operating parameters for it in order to adapt to the dynamic radio environment, all in real-time. The fundamental role of a CR is to acquire the best available spectrum for its users, based on its cognitive capability and re-configurability. Since most of the commercially available spectrum is already allocated, the real challenge is to share seamlessly the unused spectrum of the PU. Consider an example model of spectrum usage across time and frequency displayed in FIG. 1.

The interference-based detection method calculates the maximum amount of interference that the primary receiver could tolerate. As long as the cumulative RF energy from multiple sources, including the secondary users, is below under a certain limit, the secondary users are allowed to transmit in a specific spectrum band. One model to measure the interference at the receiver was introduced by FCC in FCC, "ET Docket No 03-237 Notice of inquiry and notice of proposed Rulemaking," 2003, herein incorporated in its entirety by reference, referred to as the interference temperature model. Using this model, a radio receiver can be designed to operate over a range at which the received interference level is below the interference temperature limit. The limitations of this model are that it needs information about the unlicensed user's signal modulation, activity patterns of the primary and secondary users, in addition to having control over the power levels of the SU as discussed in T. X. Brown, "An analysis of unlicensed device operation in licensed broadcast service bands," in *First IEEE International Symposium on New Frontiers in Dynamic Spectrum Access Networks,* 2005. DySPAN 2005., pp. 11-29, herein incorporated in its entirety by reference. Also the cognitive user may not be aware of the exact location of the primary receivers, which makes it impossible to measure the influence of the cognitive user's transmission on all the potential primary receivers. Because of the inherent complexities in the receiver's interference detection method, the method has gained less attention as compared to the transmitter detection methods for cognitive radios.

Transmitter detection techniques have attracted most attention because of their simplicity. When this technique is used, the cognitive radio focuses on the local observation of the signal from a primary user (transmitter). Transmitter detection can be performed either with one cognitive radio or by a group of cognitive radios cooperatively sensing a targeted spectrum band. The latter case is sometimes referred to as collaborative (cooperative) detection as discussed in A. Ghasemi and E. S. Sousa, "Collaborative spectrum sensing for opportunistic access in fading environments," in First IEEE International Symposium on New Frontiers in Dynamic Spectrum Access Networks, 2005. DySPAN 2005., pp. 131-136, herein incorporated in its entirety by reference. These (transmitter detection) techniques can be further divided into Blind/Semi-Blind Spectrum Sensing and Non-Blind Spectrum Sensing as discussed in R. Umar and A. U. H. Sheikh, "A comparative study of spectrum awareness techniques for cognitive radio oriented wireless networks," Physical Communication, August 2012, herein incorporated in its entirety by reference. The key difference among these schemes lies in the amount of a priori knowledge about the Primary User (PU) signal that is required by the cognitive radio to perform spectrum sensing. The former approach (Blind/Semi-Blind SS) is usually used when the CR have no prior information about the characteristics of the primary user signal, channel, and the noise power. The best possible knowledge the CR can have is the estimate of noise variance, hence the term Semi-Blind SS. Energy detection as discussed in A. Sahai and N. Hoven, "Some fundamental limits on cognitive radio," Allerton Conference on Comm., Control and Computing., 2004, herein incorporated in its entirety by reference, and discussed in H. Urkowitz, "Energy detection of unknown deterministic signals," Proceedings of the IEEE, vol. 55, no. 4, pp. 523-531, 1967, herein incorporated in its entirety by reference, and statistical-analysis-based detection falls under the category of Blind/Semi-Blind SS. When prior information is not available or cannot be extracted by the CR, Energy Detector is the best and simplest option to perform sensing. Energy detection is the least demanding approach as it makes the receiver implementation task relatively simple. Under the category of Non-Blind Spectrum Sensing, we have the following techniques: 1) Matched Filter detection, and 2) Cyclostationary feature detection, as discussed in A. Ghasemi and E. S. Sousa, "Spectrum sensing in cognitive radio networks: requirements, challenges and design trade-offs," IEEE Communications Magazine, vol. 46, no. 4, pp. 32-39, April 2008, herein incorporated in its entirety by reference. Matched filter detection and Cyclostationary feature detection techniques require a priori knowledge about the PU signal.

When the characteristics of the PU's signal is known by the secondary user, the optimum detection technique was found to be matched filtering, since the matched filtering technique maximizes the signal-to-noise ratio of the received signal as discussed in J. G. Proakis, Digital Communications, 4th ed. McGraw-Hill, 2001, herein incorporated in its entirety by reference. The output of the matched filter is obtained by correlating the unknown received signal with a known signal, or template, in order to find out the presence of the known signal in the unknown received signal. Matched filtering is a coherent detection approach, as a consequence of which, it requires less time to achieve high detection accuracy as compared to other techniques discussed earlier in R. Tandra and A. Sahai, "Fundamental limits on detection in low SNR under noise uncertainty," in 2005 International Conference on Wireless Networks, Communications and Mobile Computing, vol. 1, pp. 464-469, herein incorporated in its entirety by reference. The downside of the matched filtering technique is the amount of a priori information that is needed to demodulate the received signals, such as the pulse shape, bandwidth, modulation type, etc. Unless the a priori information is not perfect, the matched filter performs poorly. Furthermore, the implementation of the matched filter based sensing unit becomes impractically large since it would require dedicated receivers for each type of primary user signals as discussed in D. Cabric, S. M. Mishra, and R. W. Brodersen, "Implementation issues in spectrum sensing for cognitive radios," in Conference Record of the Thirty-Eighth Asilomar Conference on Signals, Systems and Computers, 2004., vol. 1, pp. 772-776, herein incorporated in its entirety by reference.

An alternative non-blind spectrum sensing method is the cyclostationay feature detection. This detection method exploits the embedded periodicity in the modulated signal. The periodic mean and autocorrelation of a modulated signal characterizes the signal as a cyclostationary process. The feature detection based sensing unit analyzes a spectral correlation function in order to detect the built-in periodicity of a modulated signal. Since a noise is a wide-sense stationary process without correlation, while modulated signals have spectral correlation due to the periodicity, the feature detection based technique has the capability to distinguish between the noise energy and the modulated signal energy. Consequently, a cyclostationary feature detector is robust to noise power uncertainty. The feature detector can also differentiate between a PU signal and other CR users' signal provided that all the signals exhibit different cyclic features, which is usually the case. However, the complexity of the cyclic feature detector comes from the facts that it requires the knowledge of different signal's modulation formats, as well as requires long observation times. These complexities make the feature detector implementation less favorable as compared to energy detector.

Wavelet based sensing falls under the category of Energy Detection. The relationship among all of these approaches is summarized by the branch diagram shown in FIG. 18.

Wavelets are simply a set of basis functions. A wavelet is effectively a limited-duration waveform that has an average value of zero. The wavelet transform (WT) is a mathematical tool used for projecting signals, similar to other tools that are used for signal analysis, e.g., fourier transform (FT). A comparison of Fourier transform and wavelet transform basis functions is shown in FIG. 19. Fourier analysis is perhaps the most well-known transformation to date, which transforms a time-domain signal into the frequency-amplitude representation of the signal. The FT provides the global information on frequencies presented in the signal regardless of the exact time they appear in the signal. When looking at a Fourier transform of a signal, it is impossible to tell when a particular event has happened. This property, on one hand, does not negatively affect the suitability of FT to stationary signals, but, on the other hand, makes the FT unsuitable when the signal being analyzed is non-stationary. For analyzing non-stationary signals, a transformation technique that can provide time-frequency information is necessary. Instead of the traditional FT transformation, we focus here on the WT. While the FT provides information only about the frequency components contained in a signal, the WT provides both time and frequency or time and scale representation of a signal under analysis.

The bases of the FT are time-unlimited sinusoidal waves; they extend from $-\infty$ to $+\infty$. Also sine waves are predictable and smooth, as compared to wavelet functions which tend to be rough and anti-symmetric.

While the FT is a process of decomposing a signal into sine waves of different frequencies, the WT decomposes the signal into shifted and scaled versions of the original (or mother) wavelet. Since a wavelet is an irregular (or anti-symmetric) wave, it is better suited for analyzing signals with local singularities (or sharp edges) than the more regular sinusoids.

A wavelet is represented by a mathematical function that divides a given function or continuous-time signal into different frequency components. A wavelet is generated from a single mathematical function called a mother wavelet (as shown in FIG. 3 for Gaussian wavelets), which is a finite-length or fast-decaying oscillating waveform both in time and in frequency. Mother wavelets also include some special properties such as their integer translations and dyadic dilations, which form an orthogonal basis for the energy-limited signal space. Daughter wavelets are scaled and translated (t) copies of the mother wavelet. WTs have advantages over traditional FTs for representing functions that have discontinuities and sharp changes (as inherent in user data). Moreover, wavelet transforms provide a means for accurately deconstructing and reconstructing finite, non-periodic and/or non-stationary signals, which FTs usually cannot do.

The Continuous Wavelet Transform (CWT) of a signal, s(t), is defined as the sum over all times of the signal multiplied by scaled and shifted versions of a mother wavelet function $\psi(t)$. Mathematically, the CWT of a finite energy signal, s(t), is defined as:

$$C(a,b) = \int_R s(t) \frac{1}{\sqrt{a}} \psi\left(\frac{t-b}{a}\right) dt,$$
$$a \in R^+, b \in R, s \in L^2(R)$$

where C(a, b) are the continuous wavelet transform coefficients and a is a positive scaling parameter, and b denotes the amount of time-shift, as discussed in I. Daubechies, *Ten Lectures on Wavelets,* 1st ed. SIAM, 1992 as, herein incorporated in its entirety by reference. The result of this transformation is a scale-position or scale-time representation C(scale,time). The inverse CWT can be used to recover the original signal s(t).

To recover the original signal from its CWT coefficients, the Inverse Continuous Wavelet Transform is used, and is defined by:

$$s(t) = \frac{1}{K_\psi} \int_{R^+} \int_R C(a,b) \frac{1}{\sqrt{a}} \psi\left(\frac{t-b}{a}\right) \frac{da\,db}{a^2},$$

where $K_\psi$, a constant depending on $\psi$.

It is important to understand the difference between the CWT and its discrete counter-part, the Discrete Wavelet Transform (DWT). The CWT can operate at any arbitrary scale. We can control the range of scales at which we would like to compute wavelet coefficients. The scales can range from one up to some maximum value determined depending on the level of details needed and the application of interest. In contrast with the CWT, the Discrete Wavelet Transform (DWT) calculates wavelet coefficients at specific set of scales. When the scales and positions are expressed as powers of two, we call these dyadic scales and dyadic positions. In this way, DWT is less computationally expensive than the CWT, yet as accurate. Mathematically, it can be defined after discretizing Equation 0 by limiting a and b to a discrete lattice ($a=2^j$, $b=k2^j$, $(j,k) \in Z^2$):

$$C(j,k) = \int_R s(t) \psi_{j,k}(t) dt,$$
$$(j,k) \in Z^2, s \in L^2(R)$$

where C(j, k) are the discrete wavelet transform coefficients. $\psi_{j,k}(t)$ are the wavelet basis functions or wavelet expansion functions, which are related to the original mother wavelet function $\psi(t)$ as follows:

$$\psi_{j,k}(t) = 2^{-j/2} \psi(2^{-j}t - k)$$

where j and k are the dilation and translation parameters, respectively.

To reconstruct the original signal, the Inverse Discrete Wavelet Transform (IDWT) is given by:

$$s(t) = \sum_{j \in Z} \sum_{k \in Z} C(j,k) \psi_{j,k}(t).$$

An efficient scheme for implementing the wavelet transform using filters was introduced in S. G. Mallat, "A theory for multiresolution signal decomposition: the wavelet representation," *IEEE Transactions on Pattern Analysis and Machine Intelligence*, vol. 11, no. 7, pp. 674-693, July 1989, herein incorporated in its entirety by reference, and is classically known as a two-channel subband coder as discussed in G. Strang and T. Nguyen, *Wavelets and Filter Banks,* 2nd ed. Wellesley College, 1996, p. 520, herein incorporated in its entirety by reference. This method provides a fast implementation of the wavelet transform. The wavelet decomposition is composed of low-pass and high-pass filters. The signal of interest is fed into both of these filters. The output of the filters is followed by dyadic decimation. Finally, the resulting coefficients are called approximations and details, respectively. The approximation coefficients (that correspond to the low-pass filter) are the high-scale, low-frequency components of the input signal, whereas the detail coefficients (that correspond to the high-pass filter) are the low-scale high-frequency components of the input signal. The wavelet decomposition at the first step is illustrated in FIG. 20.

In FIG. 20, the input signal s is fed into the two complementary filters and the outputs are the approximation coefficients, $cA_1$, and the detail coefficients, $cA_2$. The wavelet decomposition can be continued iteratively where at each level of decomposition; the approximations are decomposed into the next level's approximation and detail coefficients. This process leads to the analysis of the signal by decomposing it into several low resolution components and can be represented as the wavelet decomposition tree shown in FIG. 21.

As mentioned before, non-stationary signals can be best dealt with the wavelet transform. In addition to that, an attractive property of the WT is its ability to perform local analysis of a larger signal, and to detect singularities (discontinuities) in the signal. This property of WT can be used in edge detection as discussed in S. Mallat and S. Zhong, "Characterization of signals from multiscale edges," *IEEE Transactions on*

*Pattern Analysis and Machine Intelligence*, vol. 14, no. 7, pp. 710-732, July 1992, herein incorporated in its entirety by reference.

The primary users (PUs) (11, 12, 13, 14, and 15 in FIG. 1) are only active within certain time intervals. The no-activity gaps between active intervals are referred to as spectrum holes. If such spectrum holes can be detected efficiently, then these can be used by a secondary user or cognitive radio user (CR) 10 resulting in better spectrum utilization. For example in FIG. 1, at time t=0, CR 10 is using the frequency band allocated to PU 11. During the opportunistic spectrum access, wherein the CR 10 uses the spectrum allocated to PU 11, the CR 10 must monitory when PU 11 restarts using the allocated spectrum, at which time CR 10 must either move to another spectrum hole, or change operating parameters, e.g., modulation scheme, in order to avoid interference with the primary transmission. If neither of the previous two choices are available CR 10 must stop transmitting until CR 10 can transmit without interfering with the signal of a PU. In FIG. 1, the spectrum hole becomes available at the spectrum allocated to PU 14 and CR 10 changes frequency to utilize this spectrum hole while it is not used by a PU. When PU 14 begins transmitting again, CR 10 changes frequency the frequency band allocated to PU 12 while it is not being used by a PU.

The Cognitive Cycle steps are: 1) Spectrum Sensing: A CR examines the targeted frequency band(s), extracts relevant information, and identifies possible spectrum holes; 2) Spectrum Analysis: The detected spectrum holes are characterized and channel conditions are estimated within each hole; and 3) Spectrum Decision: Based on the cognitive user requirements, e.g., data rate and required bandwidth, the cognitive radio determines the best available spectrum hole for the cognitive user transmission.

While the cognitive user is transmitting over a frequency band allocated to a PU, it is important to keep track of the changes in the radio environment. For example, when the current channel conditions become worse or when the licensed user reappears, the operation of spectrum mobility comes into play, as shown in FIG. 1. During this operation, the cognitive radio switches from the current channel to some other spectrum hole, a phenomenon referred to as spectrum handoff.

From the previous discussion, it is clear that a necessary task prior to dynamic spectrum access is spectrum sensing. It is the first phase in the cognitive cycle. In this phase, efficient spectrum sensing techniques are used to track the radio environment which may change in time and space. Several spectrum sensing methods have been discussed in the literature with their merits and demerits. See, e.g., R. Umar and A. U. H. Sheikh, "A comparative study of spectrum awareness techniques for cognitive radio oriented wireless networks," *Physical Communication*, August 2012, incorporated herein in its entirety, and T. Yucek and H. Arslan, "A survey of spectrum sensing algorithms for cognitive radio applications," *IEEE Communications Surveys & Tutorials*, vol. 11, no. 1, pp. 116-130, 2009, incorporated herein in its entirety. Spectrum sensing techniques can be classified into two main categories, namely, transmitter detection, and interference-based detection. Wavelet based sensing fall under the category of Energy Detection.

When the targeted frequency band is narrowband, the radio system front end can be implemented using tunable narrowband Band-Pass Filters (BPF). However, when the spectrum utilization is high, one needs to sense a wideband spectrum in order to detect efficiently spectrum whitespaces. Under this scenario, it is inefficient to install multiple narrowband BPFs at the radio front-end to perform the sensing task. Alternatively, if only one narrowband BPF is used to scan the entire wideband (frequency range) in blocks, this becomes time consuming hence reducing the overall performance of the cognitive radio.

Observing the fact that a wideband spectrum can be thought of as a sequence of consecutive subbands, where the Power Spectral Density (PSD) within each subband is almost flat and some discontinuities exist at the boundaries of subbands. These discontinuities in the wideband PSD carry key information about the location of boundaries and the potential spectrum holes. A powerful mathematical tool for analyzing signal's local singularities is the Wavelet Transform, which can be used to extract information about edges in the signal spectrum as explained in S. Mallat and W. L. Hwang, "Singularity detection and processing with wavelets," *IEEE Transactions on Information Theory*, vol. 38, no. 2, pp. 617-643, March 1992, incorporated herein by reference in its entirety. In our case, edges in the wideband PSD refer to the boundaries of two consecutive subbands of different power levels within the wideband of interest. After the identification of subbands, energy is estimated for each of these, which carries important information on spectrum holes available for opportunistic sharing. This idea of using Wavelet Transform on the received wideband signal's PSD was first proposed in Z. Tian and G. B. Giannakis, "A Wavelet Approach to Wideband Spectrum Sensing for Cognitive Radios," in 2006 1*st International Conference on Cognitive Radio Oriented Wireless Networks and Communications*, 2006, pp. 1-5, incorporated herein by reference in its entirety.

As shown in FIG. 2, wireless signals from the licensed users shall exist within a wide band of interest in assigned non-overlapping frequency bands with possibly non-similar powers. In the wide band of interest, there are discontinuities in the PSD at the edges of the assigned frequency bands. A cognitive user, without prior knowledge of the number, bandwidth, or locations of the assigned frequency bands, can identify the frequency band edges by convolving together the PSD and wavelet functions in the frequency domain.

In FIG. 2, the radio signal received at the CR has N frequency bands in the interval $[f_0, f_N]$ being sensed by the cognitive user. The cognitive user must first identify the frequency bands assigned to primary users by identifying discontinuities in the PSD at frequencies $f_1 < f_2 < \ldots < f_{N-1}$. Next the cognitive user defines each subband such that the $n^{th}$ subband is given by $B_n = [f_{n-1}, f_n]$. The PSD as a function of frequency is given by $S_r(f)$. After identifying the subband frequency intervals, $\{f_n\}_{n=1}^{N-1}$, the PSD level within each subband is averaged to obtain $\beta_n$.

The wavelet smoothing function is given by $\phi(f)$, and FIG. 3 shows a non-limiting example of $\phi(f)$ using a to be a Gaussian wavelet. The dilation of the wavelet smoothing function $\phi(f)$ by a scale factor s is given by:

$$\varphi_s(f) = \frac{1}{s}\varphi\left(\frac{f}{s}\right)$$

The CWT of $S_\phi(f)$ is defined as the convolution of the observed signal PSD with the wavelet function:

$$W_s S_r(f) = S_r * \phi_s(f).$$

$W_s S_r(f)$ provides information on the local structure of $S_r(f)$, such that taking the derivative of $W_s S_r(f)$ and looking for the extrema will give the largest averaged discontinuities in the PSD. This operation is expressed mathematically as:

$$W'_s S_r(f) = s \frac{d}{df}(S_r * \varphi_s)(f).$$

So, the local modulus maxima $W_s'S_r(f)$ represent the edges in the PSD $S_r(f)$. More formally, the identification of frequency boundaries $\{f_n\}_{n=1}^{N-1}$ can be expressed as:

$$\hat{f}_n = \text{maxima}_f \{|W_s'S_r(f)|\}, f \in [f_0, f_N].$$

Dyadic scales will be used (i.e., $s=2^j$, $j=1, 2, \ldots J$.) as a non-limiting example of scale factors.

FIG. 3 shows an example of a wavelet smoothing function. FIG. 4 shows a flow chart for the basic wavelet transform method 310 for determining boundaries between frequency bands. As discussed above the method includes a first step of acquiring a time domain signal 311. The second step is estimating the power spectral density (PSD) 312. The third step is calculating the wavelet coefficients 313, and the final step is solving for discontinuities in the PSD 314.

The above basic method can be improved by taking advantage of the unique information provided by different dyadic scales. Small dyadic scales can resolve narrow band features but are susceptible to misidentifying high frequency noise as the edge of a frequency band. In contrast, large dyadic scales are not susceptible to high frequency noise but also smooth out narrow band features. Taking the product of CWT of $S_r(f)$ for multiple dyadic scales suppresses the noise-induced spurious local maxima, which are random at each scale. This multi-scale product is defined as:

$$U_J S_r(f) = \prod_{j=1}^{J} W'_{s=2^j} S_r(f).$$

The method provides the estimation of frequency edges $\{f_n\}$ of interest, by picking the maxima of the multi-scale product in 0. The noise-induced spurious local maxima of $|W_s'S_r(f)|$ are random at every scale and tend not to propagate though all J scales; hence, they do not show up as the local maxima of $|U_J S_r(f)|$ and peaks are enhanced due to edges while noise is suppressed:

$$\hat{f}_n = \text{maxima}_f \{|U_J S_r(f)|\}, f \in [f_0, f_N].$$

FIG. 4 shows a flow chart for the multi-scale-product method 320 of determining boundaries of frequency bands allocated to PU using wavelet transform coefficients. As discussed above the method includes a first step of acquiring a time domain signal 311, a second step of estimating the power spectral density (PSD) 312, a third step of calculating the wavelet coefficients 313, a fourth step of calculating the multi-scale product 321, and final step of solving for discontinuities in the PSD 314.

After determining the frequency bands allocated to PU, the next step is to measure the energy in each frequency band and decided whether it is being used or if it is available for use by the CR. FIG. 6 depicts a simple block diagram of an energy detector for determining if a frequency band is being used. The observed signal x(t) is fed to a band-pass filter which limits the bandwidth to W and selects some center frequency $f_c$. Following the BPF, squaring device and an integrator of a certain observation interval, T, are used. Finally, the measured energy from the integrator is compared to a pre-threshold, $\lambda$, and a decision about the presence or the absence of the primary user is made. The value of the threshold $\lambda$ depends mainly upon the noise variance.

Instead of frequency-domain analysis, one can consider the problem of spectrum sensing in time domain. One of the most common techniques used in time domain is Energy Detection. As mentioned before, when a cognitive radio receiver does not have any prior knowledge on the primary user's signal and the only thing that is known is the power of the random Gaussian noise, then the optimal solution in terms of implementation is an Energy Detector (ED) as discussed in A. Sahai and N. Hoven, "Some fundamental limits on cognitive radio," *Allerton Conference on Comm., Control and Computing.*, 2004, herein incorporated in its entirety by reference. The idea of determining the presence of unknown deterministic signals using Energy Detector was first discussed in H. Urkowitz, "Energy detection of unknown deterministic signals," *Proceedings of the IEEE*, vol. 55, no. 4, pp. 523-531, 1967, herein incorporated in its entirety by reference. FIG. 6 depicts a simple block diagram of an energy detector.

The observed signal x(t) is fed to a band-pass filter which limits the bandwidth to W and selects some center frequency $f_c$. Following the BPF, squaring device and an integrator of a certain observation interval, T, are used. Finally, the measured energy from the integrator is compared to a pre-threshold, $\lambda$, and a decision about the presence or the absence of the primary user is made. The value of the threshold $\lambda$ depends mainly upon the noise variance.

The input signal x(t) can have several possible forms based on whether the primary user is present or absent, which we denote by hypotheses $H_1$, and $H_0$, respectively:

$$x(t) = \begin{cases} n(t), & H_0 \\ h \times s(t) + n(t), & H_1, \end{cases}$$

where s(t) represents the primary user's signal, h is the channel gain, and n(t) is the noise.

In FIG. 6, the output of the integrator is effectively the decision statistic, which is represent by Y. In order to analyze the performance of the above mentioned energy detector, the statistical distribution of Y has to be known under both hypotheses. The decision statistic Y will have the following distributions:

$$Y \sim \begin{cases} \chi^2_{2TW}, & H_0 \\ \chi^2_{2TW}(2\gamma), & H_1 \end{cases}$$

where $\chi^2_{2TW}$ denotes a central chi-square distribution and $\chi^2_{2TW}(2\gamma)$ denotes a non-central chi-square distribution, both with the same degrees of freedom, i.e., 2TW (TW is the time-bandwidth product). The non-central chi-square distribution has a non-centrality parameter of $2\gamma$, where $\gamma$ is the receiver SNR (cognitive radio). For simplicity, we denote the time-bandwidth product as u=TW, and assume that T and W are chosen such that u has an integer value.

FIG. 7 depicts the two regions, $H_0$ and $H_1$, separated by a single threshold $\lambda$. This threshold divides the decision as either present if the observed energy is above the threshold (hypothesis $H_1$ is true), or otherwise absent (hypothesis $H_0$ is true). The performance of the energy-detector based spectrum sensing is established mainly on two parameters, namely, probability of misdetection $P_m$ and probability of false alarm $P_f$. If the cognitive user (CR) decides an absence while the primary user (PU) is present; this error is represented with the probability of misdetection $P_m$, which would cause a substantial interference at the PU. On the other hand, if the CR decides a presence while the PU is absent, the cognitive user would miss a spectrum usage opportunity; a phenomenon represented by the probability of false alarm $P_f$. Jointly, the probability of misdetection $P_m$ and the probability of false alarm $P_f$ define what is called Complementary Receiver Operating Characteristics (C-ROC). Sometimes instead of $P_m$, we use the probability of detection $P_d$ which is related to $P_m$ as $1-P_m$. Probability of detection $P_d$ defines the probability with which the CR will detect the presence of PU, given the PU is actually active. These parameters can generally be evaluated as:

$$P_m = Pr(Y < \lambda | H_1)$$

$$P_f = Pr(Y > \lambda | H_0)$$

$$P_d = 1 - P_m = Pr(Y > \lambda | H_1)$$

where, as before, $\lambda\lambda$ is the decision threshold. The plot of $P_d$ vs. $P_f$ is called Receiver Operating Characteristics (ROC).

There is always a trade-off between $P_d$ (or $P_m$) and $P_f$. As illustrated in FIG. 22, we can have two distinct PDFs of a received signal, corresponding to two possible hypotheses, $H_0$ and $H_1$. By varying the threshold, we can control the two type errors, namely, $P_m$ and $P_f$. If the threshold is kept excessively low, $P_m$ decreases at the expense of increased $P_f$. A high $P_f$ implies spectrum inefficient utilization because of high false alarms. Alternatively, if the threshold is set needlessly high, we can reduce $P_f$ at the cost of increasing $P_m$. A high $P_m$ implies a high probability of interfering while PU is active. Evidently, we cannot reduce both types of error simultaneously. The optimal approach is to use Neyman-Pearson detector as discussed in S. M. Kay, *Fundamental of Statistical Signal Processing: Detection Theory*. Englewood Cliffs, N.J.: Prentice-Hall, 1998, herein incorporated in its entirety by reference, where we constrain $P_f$ to a fixed value, and minimize $P_m$. In other words, we fix the value of $P_f$ and try to maximize $P_d$.

If we consider no fading, then h will be a constant in equation 0. For such additive white Gaussian noise (AWGN) environment, the closed-form expressions for $P_d$ and $P_f$ has been reported in F. F. Digham, M. S. Alouini, and M. K. Simon, "On the energy detection of unknown signals over fading channels," in *IEEE International Conference on Communications, 2003. ICC '03.*, 2003, vol. 5, pp. 3575-3579, herein incorporated by reference in its entirety, as:

$$P_{d AWGN} = Q_u(\sqrt{2\gamma}, \sqrt{\lambda})$$

where $Q_u(a, b)$ is the generalized Marcum Q-function as discussed in A. Nuttall, "Some integrals involving the Q_M function (Corresp.)," *IEEE Transactions on Information Theory*, vol. 21, no. 1, pp. 95-96, January 1975, herein incorporated by reference in its entirety, and $$P_f = \frac{\Gamma\left(u, \frac{\lambda}{2}\right)}{\Gamma(u)}$$

where $\Gamma(.,.)$ and $\Gamma(.)$ are the incomplete and complete gamma function, respectively.

For the case where we assume the channel fading h to be Rayleigh distributed, only the expression for $P_d$ will change. Under Rayleigh fading, the signal-to-noise-ratio (SNR) $\gamma$ will follow exponential distribution and for this case $P_{d\,Ray}$ is shown to be derived as:

$$P_{dRay} = e^{-\frac{\lambda}{2}} \sum_{n=0}^{u-2} \frac{1}{n!}\left(\frac{\lambda}{2}\right)^n + \left(\frac{1+\bar{\gamma}}{\bar{\gamma}}\right)^{u-1}\left[e^{-\frac{\lambda}{2(1+\bar{\gamma})}} - e^{-\frac{\lambda}{2}}\sum_{n=0}^{u-2}\frac{1}{n!}\frac{\lambda\bar{\gamma}}{2(1+\bar{\gamma})}\right]$$

where $\bar{\gamma}$ is the average received SNR. Since $P_f$ is considered when there is no signal present and as such is independent of SNR $\gamma$, therefore, its expression remains the for the cases of fading and non-fading channels.

A high $P_f$ implies spectrum inefficient utilization because of high false alarms. Alternatively, if the threshold is set needlessly high, we can reduce $P_f$ at the cost of increasing $P_m$. A high $P_m$ implies a high probability of interfering while PU is active. Evidently, we cannot reduce both types of error simultaneously. The optimal approach is to use Neyman-Pearson detector as discussed in S. M. Kay, *Fundamental of Statistical Signal Processing: Detection Theory*. Englewood Cliffs, N.J.: Prentice-Hall, 1998, herein incorporated by reference in its entirety, where we constrain $P_f$ to a fixed value, and minimize $P_m$. In other words, we fix the value of $P_f$ and try to maximize $P_d$.

As with any wireless communication system, the performance degrades in multipath fading channels. One way to overcome the effects of multipath fading is to use multiple antennas to improve performance as discussed in S. M. Alamouti, "A simple transmit diversity technique for wireless communications," *IEEE Journal on Selected Areas in Communications*, vol. 16, no. 8, pp. 1451-1458, 1998, herein incorporated in its entirety by reference. Similarly, fading in wireless channels creates uncertainty in the SNR at the CR receiver input, making it difficult for the CR to provide a reliable decision about the absence or presence of the PU, since when the CR is experiencing a deep fading or shadowing due to large obstacles over the primary-to-secondary channel, the amount of energy observed during a fixed time-bandwidth product may not be enough to decide about the presence of a PU. One way to overcome this problem is to increase the amount of local processing which, in the case of energy detector, translates into increasing the time-bandwidth product. However, this is not always possible due to constraints of the sensing period set by the regulator.

Rather than increasing the time-bandwidth product, the cognitive user can cooperate with neighboring cognitive users as discussed in G. Ganesan, Y. Li, and S. Li, "Spatiotemporal Sensing in Cognitive Radio Networks," in *2007 IEEE 18th International Symposium on Personal, Indoor and Mobile Radio Communications*, 2007, pp. 1-5, herein incorporated in its entirety by reference. Since the multipath fading statistics fluctuates considerably on the scale of a fraction of wavelength and shadowing fluctuates considerably on the scale of 20-500 m based on the nature of environment, it is highly unlikely that multiple cooperating CRs will experience deep fade and/or large obstacles at the same time as discussed in J. Ma, G. Y. Li, and B. H. Juang, "Signal processing in cognitive radio," *Proceedings of the IEEE*, vol. 97, no. 5, pp. 805-823, 2009, herein incorporated in its entirety by reference, F. F. Digham, M.-S. Alouini, and M. K. Simon, "On the Energy Detection of Unknown Signals Over Fading Channels," *IEEE Transactions on Communications*, vol. 55, no. 1, pp. 21-24, January 2007, herein incorporated in its entirety by reference, and I. F. Akyildiz, B. F. Lo, and R. Balakrishnan, "Cooperative spectrum sensing in cognitive radio networks: A survey," *Physical Communication*, vol. 4, no. 1, pp. 40-62, March 2011, herein incorporated in its entirety by reference.

The cooperation between multiple CRs can be carried in either a centralized or a distributed fashion as shown in FIG. 8 and FIG. 9. FIG. 8 shows cognitive users CR1 20, CR2 30, CR3 40, CR4 50, and CR5 60 reporting measurement results to a centralized node CR0 70 called the fusion center (FC). In contrast, FIG. 9 shows distributed network of cognitive users, where each CR operates as its own FC. In both cases the FC operates in a nearly identical manner. Thus the essentially difference between distributed and centralized network architectures is the location of the FC, not the function of the FC. For simplicity we discuss only the centralized cooperation system of CRs, but the results are equally applicable to a distributed cooperation system of CRs.

When a centralized fusion center (CR0 70 in FIG. 8) is used to handle the different cognitive decisions, the cooperative spectrum sensing can be performed in the following manner: 1) All the cooperating cognitive users start by sensing a targeted band independently; 2) Each cooperating node would forward either its local binary decision or it can just send its observation value directly to the fusion center (FC) 70 over the reporting channel 19; 3) Finally, the fusion center 70 fuses all the received data (or decisions) to infer the presence or absence of the PU 20. The fusion center 70 can also be referred to as common receiver, master node, base station, combining node, and designated controller. As shown in FIG. 8, CR0 is the FC while CR1-CR5 (20, 30, 40, 50, and 60) are the cooperating CRs. When using cooperation among multiple CRs for spectrum sensing, certain protocols need to be defined for the purpose of sharing sensing information over the reporting channel 19. In contrast to the reporting channel 19, the physical point-to-point connection between the PU and a CR for the purpose of sensing the primary transmitter's signal is called a sensing channel 18. Different architecture have been proposed for reporting channels, e.g. using ISM band and ultra wide band (UWB) have been discussed in C. Guo, T. Zhang, Z. Zeng, and C. Feng, "Investigation on Spectrum Sharing Technology Based On Cognitive Radio," in 2006 *First International Conference on Communications and Networking in China*, 2006, pp. 1-5, and J. Perez-Romero, O. Sallent, R. Agusti, and L. Giupponi, "A Novel On-Demand Cognitive Pilot Channel Enabling Dynamic Spectrum Allocation," in 2007 *2nd IEEE International Symposium on New Frontiers in Dynamic Spectrum Access Networks*, 2007, pp. 46-54. A simple protocol using time division multiple access (TDMA) to share the sensing information with the fusion center is proposed in P. Pawelczak, C. Guo, R. V. Prasad, and R. Hekmat, "Clusterbased spectrum sensing architecture for opportunistic spectrum access networks," in *IEEE Vehicular Technology Conference VTC2007*, 2007, where the cooperating CRs are divided into clusters based on their geographical location and send their sensing data to the particular cluster head only during the assigned time slots.

It is very important to consider that the cooperation mechanism should have as low as possible overhead, and it should be robust to network changes and failures. Also, the amount of delay needs to be minimized for a particular cooperation algorithm. Usually, such type of protocols are defined at Medium Access Layer (MAC) as discussed in L. Musavian and T. Le-Ngoc, "Cross-layer design for cognitive radios with joint AMC and ARQ under delay QoS constraint," in 2012 *8th International Wireless Communications and Mobile Computing Conference (IWCMC)*, 2012, pp. 419-424, herein incorporated in its entirety by reference.

Based on whether the CRs are sending their 1-bit binary decision or their observation value to the fusion center, the combination is called either decision fusion or data fusion, respectively. Sometimes the terms hard combination and soft combination are used instead of using the respective terms decision fusion or data fusion.

FIG. 10 shows a proposed cooperative spectrum sensing framework from I. F. Akyildiz, B. F. Lo, and R. Balakrishnan, "Cooperative spectrum sensing in cognitive radio networks: A survey," *Physical Communication, vol.* 4, no. 1, pp. 40-62, March 2011, herein incorporated in its entirety by reference. The framework consists of the PU, cooperating CRs, FC, the RF channels (sensing and reporting channels), and an optional remotely located database. As shown in the framework, a group of collaborative CRs, presumably independent of each other, perform targeted sensing using their RF frontend 21. The processing unit, 22 od CR1 20 may include, at least, a signal processor 23, data fusion 24, and hypothesis testing 25 entities. The RF frontend 21 is capable to be configured for data transmission or local sensing. Besides that, analog-to-digital conversion will also be done by the RF frontend 21. The local observations of the cooperating CRs (20, 30, and 40) can directly be transmitted to the FC 70, or it can be locally processed to provide a decision to the FC 70. Usually, certain amount of processing on the local observations is needed to minimize the bandwidth requirement over the reporting channels. The processing may include the evaluation of the energy statistics and thresholds. When the local decision or the observations are ready, a request to a higher layer (e.g., MAC layer) is sent to acquire the access of a control channel. The FC 70 in the centralized CSS framework 100 is a powerful cooperating CR which has all the capabilities as the other CRs. In addition, the FC 70 has other functionalities, such as user selection and knowledge base, to undertake the cooperation tasks successfully. Based on the requirement and the ability of the FC 70, the FC 70 can be connected to an external (remotely located) database 81 through an ultra-high speed communication medium 82 (e.g., fiber optics). This external database will assist the FC and can provide information regarding the PU 20 activity and white spaces.

When decision-fusion is used, each CR compares its observed energy value with pre-fixed threshold $\lambda$, if the observed value is greater than $\lambda$, the reported decision is 1 ($H_1$), while the reported decision is 0 ($H_0$) if the value is less than the threshold. After collecting L local 1-bit decisions, the fusion center makes an occupancy-decision based on a certain decision-fusion rule, which can be represented as $$Z = \sum_{i=1}^{L} D_i \begin{cases} \geq K, & H_1 \\ < K, & H_0 \end{cases},$$

As discussed in K. Ben Letaief, "Cooperative Communications for Cognitive Radio Networks," *Proceedings of the IEEE*, vol. 97, no. 5, pp. 878-893, May 2009, herein incorporated by reference in its entirety.

If there exists at least K out of L CRs having their local observation values above the pre-fixed thresholds, then the fusion center will infer presence of the PU, i.e., $H_1$, otherwise the fusion center will declare that there is no PU signal transmitted, i.e, $H_0$. Such decision criterion is also called K-out-of-L rule as discussed in P. K. Varshney, *Distributed Detection and Data Fusion*. New York: Springer-Verlag, 1997, p. 299, herein incorporated in its entirety by reference. It was shown in A. Ghasemi and E. S. Sousa, "Spectrum sensing in cognitive radio networks: the cooperation-processing tradeoff," *Wireless Communications and Mobile Computing*, vol. 7, no. 9, pp. 1049-1060, November 2007, herein incorporated in its entirety by reference, that under the case of distributed individual and independent decisions, the optimum (in terms of detection performance) decision-fusion rule is 1-out-of-L rule (i.e., OR rule). Therefore, in the rest of the thesis we shall resort to the OR rule as our final decision-fusion rule. Instead of calculating individual thresholds for each cooperating user, for simplicity, it is assumed that all collaborative cognitive users have the same decision rule (i.e., same threshold $\lambda$), according to some fixed cooperative probability of false-alarm, $Q_f$ as discussed in A. Ghasemi and E. S. Sousa, "Collaborative spectrum sensing for opportunistic access in fading environments," in *First IEEE International Symposium on New Frontiers in Dynamic Spectrum Access Networks*, 2005. *DySPAN* 2005., pp. 131-136, herein incorporated in its entirety by reference.

FIG. 11 shows a flow chart of the hard decision time domain method 420 for a cooperative spectrum sensing network of CRs to determine whether a frequency band allocated to PUs is being used. The method includes a first step of calculating the energy in the frequency band 411, a second step of determining the received energy value 412, a third step of making a hard decision about whether the frequency band is used 421, a fourth step of transmitting the CR result to a FC 413, a fifth step of the FC combining results from multiple CRs to obtain a final decision 422, and a final step of transmitting the final decision to the CRs 415.

Alternatively to the decision fusion for hard decisions discussed above, the fusion center can also exploit the diversity provided by using a data-fusion criterion to determine the occupancy state of the targeted band. In data-fusion, each CR simply reports their original sensing data to the fusion center. Although, data-fusion imposes large amount of communication overhead over the control channel, but it has excellent detection performance as discussed in J. Ma, G. Y. Li, and B. H. Juang, "Signal processing in cognitive radio," *Proceedings of the IEEE*, vol. 97, no. 5, pp. 805-823, 2009, herein incorporated in its entirety by reference. A data-fusion based cooperative spectrum sensing method was proposed in S. Haykin, "Cognitive radio: brain-empowered wireless communications," *IEEE Journal on Selected Areas in Communications*, vol. 23, no. 2, pp. 201-220, February 2005, herein incorporated in its entirety by reference, which he called it as multi-taper-method singular-value-decomposition (MTM-SVD). In the MTM-SVD, the L cooperating CR users cooperatively estimate the interference temperature of the radio environment. As discussed in D. J. Thomson, "Spectrum estimation and harmonic analysis," *Proceedings of the IEEE*, vol. 70, no. 9, pp. 1055-1096, 1982, herein incorporated in its entirety by reference, each cooperating CR applies mutitaper method to analyze the spectrum by first computing its $k^{th}$ eigenspectrum for the targeted band as:

$$Y_k^{(l)}(f) = \sum_{n=1}^{N} w_k(n) y_l(n) e^{-i\omega n},$$

$$1 \leq k \leq K$$

where $y_l(n)$ are the observed samples at the $l^{th}$ CR, and $w_k(n)$ represents the $k^{th}$ Slepian sequence (discussed in D. Slepian, "Prolate spheroidal wave functions, Fourier analysis and uncertainty," *Bell Syst. Tech. J.*, vol. 57, pp. 1371-1430, 1978, herein incorporated that each CR is to send its eigenspectrum vector $$Y_l(f) = (Y_1^{(l)}(f), Y_2^{(l)}(f), \ldots, Y_K^{(l)}(f)), 1 \leq l \leq L$$

to the fusion center. Based on such vectors from each of the L cooperating CRs, the fusion center computes an L×K eigenspectrum matrix as:

$$A(f) = \begin{bmatrix} w_1 Y_1^{(1)}(f) & w_1 Y_2^{(1)}(f) & \ldots & w_1 Y_K^{(1)}(f) \\ w_2 Y_1^{(2)}(f) & w_2 Y_2^{(2)}(f) & \ldots & w_2 Y_K^{(2)}(f) \\ \vdots & \vdots & \ddots & \vdots \\ w_L Y_1^{(L)}(f) & w_L Y_2^{(L)}(f) & & w_M Y_K^{(L)}(f) \end{bmatrix}$$

where $w_l$ are the weights of $l^h$ CR which is computed after taking into consideration the instantaneous environment information into account. Each row in A(f) corresponds to the eigenspectrum vector from a particular CR. If the primary user is present, the eigenspectrum vector consists of the PU signal plus noise. The noise is independent for the distributed CRs, while there will be a correlation in the PU signal part. Observing this fact, the MTM-SVD scheme exploits the correlation due to the PU signal by applying SVD to the eigenspectrum matrix 0:

$$A(f) = \sum_{k=1}^{K} \sigma_k(f) u_k(f) v_k^H(f)$$

where $\sigma_k(f)$ is the $k^{th}$ singular value of A(f), $u_k(f)$ and $v_k(f)$ are the associated left and right singular vectors, respectively. Finally, the fusion center takes the spectrum occupancy decision based on the largest singular value of the matrix A(f). This method (MTM-SVD) provides a means for cooperative spectrum sensing to estimate the presence or absence of the primary user with high accuracy as discussed in J. Ma, G. Y. Li, and B. H. Juang, "Signal processing in cognitive radio," *Proceedings of the IEEE*, vol. 97, no. 5, pp. 805-823, 2009, herein incorporated in its entirety by reference.

For the MTM-SVD scheme described above, the complexity of the whole procedure is quite high. Not only sending the K-dimensional vector from each CR to the fusion center would increase lots of communication burden over the reporting channel, but the SVD operation on the matrix A(f) is also computationally very expensive.

Eigenvalue based cooperative spectrum sensing has also been proposed in S. Xu, Y. Shang, and H. Wang, "Eigenvalues based spectrum sensing against untrusted users in cognitive radio networks," in 2009 *4th International Conference on Cognitive Radio Oriented Wireless Networks and Communications*, 2009, pp. 1-6, herein incorporated in its entirety by reference. This method uses the eigenvalue based approach originally proposed in Y. Zeng, C. L. Koh, and Y.-C. Liang, "Maximum Eigenvalue Detection: Theory and Application," in 2008 *IEEE International Conference on Communications*, 2008, pp. 4160-4164, herein incorporated in its entirety by reference. Observing the fact that the statistical covariance matrix of the observed signal will have different characteristics based on whether the PU is present or not, it has been proposed that an eigenvalue decomposition based approach. In this approach, the sample covariance matrix is computed from the observed signal's samples. Then the maximum eigenvalue (MEV) of the sample covariance matrix is calculated and the value is compared with a threshold to decide about the spectrum availability. This approach has been used in a cooperative fashion where each cooperating CR user performs the eigenvalue decomposition of the sample covariance matrix, and the MEV is computed. This MEV is compared with prefixed two-thresholds to decide about the reliability of the cooperating CRs. The CRs with reliable decision sends their decision to the fusion center, where the non-reliable ones send directly their MEVs to the fusion center. Finally, the fusion center fuses all the data to decide about the occupancy state of the spectrum. Although, the eigenvalue based spectrum sensing technique provides very good results without any prior knowledge about the channel, noise power, or PU signal, but the whole decomposition process is quite computationally expensive. Also the use of the random matrix theory to set the threshold values makes it difficult to obtain the accurate closed form expression for the thresholds.

Various soft-combination schemes with low-complexity have been discussed in J. Ma, G. Zhao, and Y. Li, "Soft Combination and Detection for Cooperative Spectrum Sensing in Cognitive Radio Networks," *IEEE Transactions on Wireless Communications*, vol. 7, no. 11, pp. 4502-4507, November 2008, herein incorporated in its entirety by reference. In these schemes, each CR reports the value of the received energy to the fusion center, and the fusion center takes a decision based on a certain data-fusion (combining) criterion (or diversity combining) rule as discussed in A. Pandharipande and J.-P. M. G. Linnartz, "Performance Analysis of Primary User Detection in a Multiple Antenna Cognitive Radio," in 2007 *IEEE International Conference on Communications*, 2007, pp. 6482-6486, herein incorporated in its entirety by reference. In D. Brennan, "Linear Diversity Combining Techniques," *Proceedings of the IRE*, vol. 47, no. 6, pp. 1075-1102, June 195, herein incorporated in its entirety by reference, it was shown that, under the case of independent diversity branches, the optimum combining scheme is Maximal Ratio Combining (MRC). However, MRC requires full channel knowledge (amplitude and phase) for all branches. In MRC reception, the received signals $\{x_l(t)\}_{l=1}^{L}$, where L is the number of diversity branches, are first co-phased, weighted proportionately to their channel gain and then summed up to yield a new signal $x_{MRC}(t)=\Sigma_{l=1}^{L} h_l^* x_l(t)$, where $h_l$ is the channel coefficient of the $l^{th}$ diversity branch. A less complex scheme is the traditional Equal Gain Combining (EGC), which doesn't require channel fading amplitudes estimation, and, under the case of identical and independent diversity branches, provides a comparable detection performance to that of MRC as discussed in S. P. Herath, N. Rajatheva, and C. Tellambura, "Energy Detection of Unknown Signals in Fading and Diversity Reception," *IEEE Transactions on Communications*, vol. 59, no. 9, pp. 2443-2453, September 2011, herein incorporated in its entirety by reference, and A. Ghasemi and E. S. Sousa, "Opportunistic Spectrum Access in Fading Channels Through Collaborative Sensing," *Journal of Communications*, vol. 2, no. 2, pp. 71-82, March 2007, herein incorporated in its entirety by reference. In EGC reception the received signals $\{x_l(t)\}_{l=1}^{L}$, where L is the number of diversity branches, are co-phased only in each branch and then summed up to yield a new signal $x_{EGC}(t)=\Sigma_{l=1}^{L} e^{-j\phi_l} x_l(t)$, where $\phi_l$ is the phase of the $l^{th}$ diversity branch. Since the difference between MRC and EGC is not very large in terms of performance, but in terms of complexity, MRC is more complex than EGC, therefore we shall resort to EGC as our data-fusion rule and assume that a base station has the necessary information to perform EGC of received energy detector outputs.

FIG. 12 shows a flow chart of the soft decision time domain method 410 for a cooperative spectrum sensing network of CRs to determine whether a frequency band allocated to PUs is being used. The method includes a first step of calculating the energy in the frequency band 411, a second step of determining the received energy value 412, a third step of transmitting the CR result to a FC 413, a fourth step of the FC combining results from multiple CRs to obtain a final decision 422, and a final step of transmitting the final decision to the CRs 415.

FIG. 23 and FIG. 24 show simulation results for a network of ten CRs using the decision fusion (the OR rule and indicated in the figures by the diamond symbol) and using data fusion (EGC and indicated in the figures by the circle symbol). As discussed above, the performance degradation under fading environments can be mitigated by the use of multiples cooperating CR nodes. Below we will show the simulation results under additive white Gaussian noise (AWGN) and Rayleigh fading environments which shows the performance gain in combining ten cooperating CRs and using either data- or decision-fusion techniques. As discussed in A. Ghasemi and E. S. Sousa, "Opportunistic Spectrum Access in Fading Channels Through Collaborative Sensing," *Journal of Communications*, vol. 2, no. 2, pp. 71-82, March 2007, herein incorporated by reference in its entirety, it has been shown that 10 cooperating users are sufficient enough to: 1) Provide high detection performance while keeping the probability of false-alarm extremely low, 2) Lower the required observation time and bandwidth, 3) Lower the required received SNR value, 4) Mitigate the fading effects.

The decision fusion (OR rule) approach requires fewer bits over the reporting channel (1-bit per user). On the other hand, when data fusion EGC is used, more feedback bits are required (m-bits per user, m≥1m≥1), which sacrifices the spectral efficiency. However, as shown in the simulation results above for cooperative spectrum sensing, data fusion outperforms decision fusion. Therefore, as can be seen from the above, we have a very clear tradeoff between performance and number of bits. One improvement of the hybrid data-decision method is that it minimizes communication bandwidth similar to data fusion while maintaining the performance of data fusion by employing a bi-threshold detector that switches between hard decisions (decision fusion) and soft decisions (data fusion) depending on the magnitude of the signal. When all CRs are equipped with bi-threshold detectors the network of CRs will self-select into a set of CRs with binary decisions and another set of CRs providing energy measurements, but not decisions, to the fusion center. Because many CRs provide decisions, requiring significantly less data be reported to the fusion center, the hybrid data-decision fusion method can substantially reduce the overall number of sensing bits over the reporting channel at the expense of a negligible loss in performance compared to EGC. Also, in contrast to the bi-threshold detector in C. Sun, W. Zhang, and K. Ben Letaief, "Cooperative Spectrum Sensing for Cognitive Radios under Bandwidth Constraints," in 2007 *IEEE Wireless Communications and Networking Conference*, 2007, pp. 1-5, herein incorporated by reference in its entirety, which are used to perform only decision fusion, the hybrid data-decision fusion method exploits the information of those CRs sending soft decisions in order to improve the performance.

SUMMARY OF THE INVENTION

The foregoing paragraphs have been provided by way of general introduction, and are not intended to limit the scope of the following claims. The described embodiments, together with further advantages, will be best understood by reference to the following detailed description taken in conjunction with the accompanying drawings.

In one aspect the present disclosure provides a robust and efficient method for spectrum sensing to detect spectrum holes by estimating the power spectral density (PSD) of a received signal and finding the boundaries between allocated frequency bands within a wider band of interest by detecting discontinuities in the PSD, where the discontinuities in the PSD are detected using wavelet transforms, and by finding the local extrema of the wavelet transform coefficients. The frequency bands are defined by the boundaries between allocated frequency bands. After discovering the extent each the frequency band within the wider band of interest, a decision is made about whether the frequency band is available to cognitive users. This decision is made by detecting the energy within the frequency band and comparing the energy to a threshold, and signaling the frequency band availability.

In another aspect the disclosure provides a bi-threshold energy detector with a higher threshold and a lower threshold to decide whether the frequency band is available to cognitive radio users. When the signal is less than both thresholds the decision is a hard decision that the frequency band is available. When the signal is greater than both thresholds the decision is a hard decision that the frequency band is not available. When the signal is greater than the lower threshold and less than the higher threshold, then decision is a soft decision and bi-threshold detector reports a signal proportional to the received energy value for the frequency band.

In another aspect the disclosure provides a fusion center to receive hard decisions and soft decisions from a cooperative spectrum sensing network of cognitive radio users, where the cognitive radio users are equipped with bi-threshold energy detectors. The fusion center performs data fusion on the soft decision, such that the soft decisions for each frequency band are combined into a cooperative soft decision. The fusion center performs data fusion on the hard decision, such that the hard decisions for each frequency band are combined into a cooperative hard decision. For each frequency band, the fusion center combines the soft cooperative decision and the hard cooperative decision to obtain a final decision and signal frequency band availability.

In another aspect the disclosure provides that the fusion center performs data fusion on the hard decisions from the network of cognitive radio users by deciding that if all of the hard decisions are that the frequency band is available, then the cooperative hard decision is that the frequency band is available to cognitive radio users, and otherwise the cooperative hard decision is that the frequency band is not available.

In another aspect the disclosure provides that the fusion center performs decision fusion on the soft decisions from the network of cognitive radio users by linear combining the reported received energy values from cognitive radio users making soft decision, and when the linear combination of received energy values is less than a cooperative soft decision threshold, then the cooperative soft decision is that the frequency band is available, and otherwise the cooperative soft decision is that the frequency band is not available.

In another aspect the disclosure provides that the fusion center makes a final decision by combining the cooperative soft decision and the cooperative hard decision. The final decision is that the frequency band is available, if the cooperative soft decision and the cooperative hard decision are both that the frequency band is available, otherwise the final decision is that the frequency band is not available.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
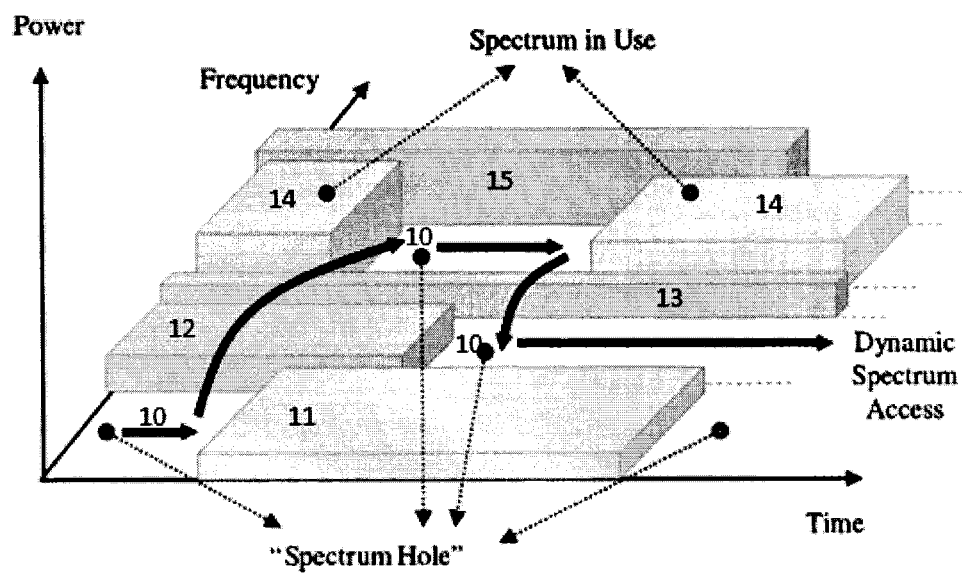
FIG. 1 is a three axis plot showing time, frequency, and power on the axes. The figure gives a notional example of the spectrum sensing and spectrum handoff in a cognitive radio as discussed in I. F. Akyildiz, W.-Y. Lee, M. C. Vuran, and S. Mohanty, "next generation/dynamic spectrum access/cognitive radio wireless networks: A survey," *Computer Networks*, vol. 50, no. 13, pp. 2127-2159, September 2006.

Referring now to the drawings, wherein like reference numerals designate identical or corresponding parts throughout the several views.

The method of the present invention is an improvement over the multi-scale product method, the equal gain combining data fusion method, and the k out of L decision fusion method. The method improves the ability of a cognitive radio to detect discontinuities in a measured power spectral density (PSD), and then determine if the frequency bands bounded by these discontinuities are being used by a primary user (PU). The discontinuities in the PSD correspond to boundaries between frequency band allocated to PU, the discontinuities arising from practical aspects of RF communications such as the use of guard bands, choice of modulation scheme, differences in received power from different PUs, etc.

In order to overcome the problem of spectrum scarcity and efficiently utilize of the radio spectrum, the Cognitive Radio approach makes nodes (i.e. individual CRs) aware of their environment, and parameters are modified in real-time, based on the predicted situation of the targeted frequency bands. In this way, the foremost operation of a Cognitive Radio is to sense the targeted spectrum, and then make a decision on the availability of spectrum so that secondary users can benefit from it. Note that the spectrum sensing operation is a very challenging task and needs to be accurate and efficient in order to enable the Cognitive Radio system to work effectively.

In order to sense the surrounding environment reliably, the spectrum sensing ability of a cognitive radio must be accurate and robust. However, spectrum sensing becomes a very challenging task when the cognitive user has no prior information about the signal characteristics of the primary (licensed) user that might be active in a particular frequency band of interest. Besides the inability of the cognitive user to know about the primary user's signal characteristics beforehand, the situation becomes more complicated under the so-called fading effect due to environmental obstacles.

FIG. 1 show the process of spectrum handoff, wherein a cognitive radio user (CR) transmitting over a licensed frequency band tracks change to the radio environment, and when a primary user (PU) begins transmitting on the same frequency band as the CR, the CR changes frequency using alternative unused spectrum. Cognitive radio to improve spectrum utilization benefits to a wide range of frequencies and application spaces spanning wireless communication networks including: a cellular system (e.g., GSM, CDMA, etc.), a WiFi system, a microwave system, a millimeter-wave radio system, a satellite communication system, etc. The wide band of interest could contain signals employing many different modulation schemes including: analog modulation such as amplitude modulation, phase modulation, frequency modulation, single side band modulation, space modulation, etc. or digital modulation such as phase shift key modulation, frequency shift key modulation, amplitude shift key modulation, quadrature amplitude modulation, quadrature phase modulation, etc. or any other modulation principle. The PSD will have discontinuities at the boundaries between frequency bands allocated to PUs as discussed in Z. Tian and G. B. Giannakis, "A Wavelet Approach to Wideband Spectrum Sensing for Cognitive Radios," in 2006 *1st International Conference on Cognitive Radio Oriented Wireless Networks and Communications*, 2006, pp. 1-5.

As with any wireless communication system, the performance degrades in multipath fading channels. One way to overcome the effects of multipath fading is to use multiple antennas to improve performance. Similarly, fading in wireless channels creates uncertainty in the SNR at the CR receiver input, making it difficult for the CR to provide a reliable decision about the absence or presence of the PU, since when the CR is experiencing a deep fading or shadowing due to large obstacles over the primary-to-secondary channel, the amount of energy observed during a fixed time-bandwidth product, TW, may not be enough to decide about the presence of a PU. One way to overcome this problem is to increase the amount of local processing which, in the case of energy detector, translates into increasing the time-bandwidth product. The bandwidth W is usually limited to that of the PU's signal, while, the sensing duration T can be controlled at the CR, but it should be kept below a certain value, $T_p$, to meet the requirements of sensing period set by the regulator, as discussed in A. Ghasemi and E. S. Sousa, "Spectrum sensing in cognitive radio networks: the cooperation-processing tradeoff," *Wireless Communications and Mobile Computing*, vol. 7, no. 9, pp. 1049-1060, November 2007, herein incorporated in its entirety by reference. In such a case, the single CR can use a more sophisticated sensing approaches such as feature detection, however, feature detection approach requires a priori information about the PU signal characteristics (cyclic frequencies of the PU's signal) which is assumed to be not known in our spectrum sensing model of the problem. From the above discussion, we can see that with only one CR (no diversity), it is almost impossible to achieve simultaneously a very high value for $P_d$ and a very low value for $P_f$. The fact that the cognitive radio does not have PU's location information just adds to the performance degradation of local sensing. To make the simple energy detection scheme viable, the neighboring secondary users should cooperate. Since the multipath fading statistics fluctuates considerably on the scale of a fraction of wavelength and shadowing fluctuates considerably on the scale of 20-500 m based on the nature of environment, it is highly unlikely that multiple cooperating CRs will experience deep fade and/or large obstacles at the same time. Hence, the cooperation between multiple CRs was proposed by researchers to improve the sensing performance of CROWN. Having neighboring nodes allowed to collaboratively perform the job of spectrum sensing, it was found that collaboration can improve sensing performance, mitigate the stringent sensing requirements, and decrease the overall required detection time. In addition, the use of cooperation can solve hidden primary user problem. The cooperation between multiple CRs can be carried in either a centralized (i.e. FIG. 8) or a distributed fashion (i.e. FIG. 9).

Figure 8:
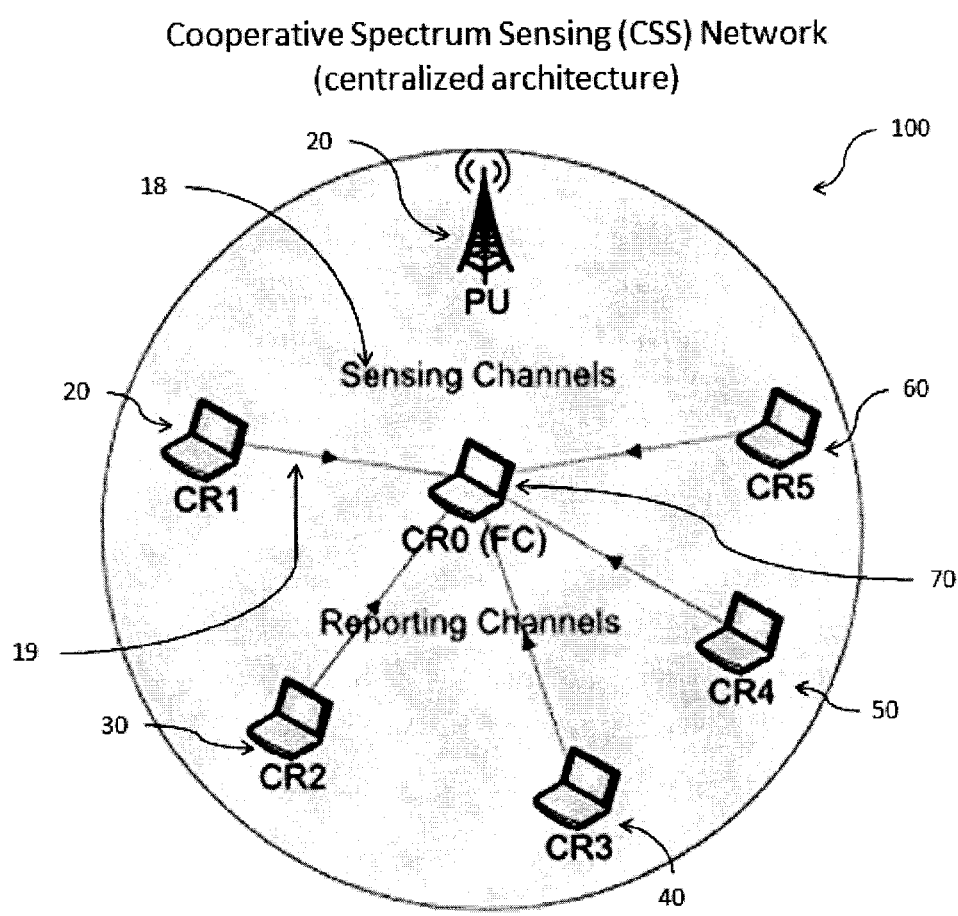
FIG. 8 is a schematic of the cooperative spectrum sensing (CSS) network for cognitive radio using a centralized architecture.

As shown in FIG. 8 a cognitive radio network is formed when multiple cognitive radio users (sometimes called secondary users) cooperate to determine spectrum holes (sometimes called white spaces) in a RF wireless environment with bandwidth scarcity. The cognitive radio users (CRs)—20, 30, 40, 50, and 60—sense the RF environment through the sensing channel 80 searching for spectrum holes. For our discussion it is assumed that all of the frequency bands within the bandwidth of the cognitive radio users are allocated to licensed primary users (PUs). For example, FIG. 8 shows a PU 11. In order to not interfere with the wireless signals of the PUs the CRs can only transmit over an allocated frequency band when it is not being used by the PU. Sensing when a frequency band is being used can be difficult for a single CR in an environment of channel fading or when the CR is shadowed from the PU's signal. More robust detection of spectrum holes can be performed when CRs cooperate because the channel fading and shadowing varies with the position of the CR.

When a centralized fusion center (CR0 in FIG. 8) is used to handle the different cognitive decisions, the cooperative spectrum sensing is performed by: 1) each of the cooperating CRs first senses a targeted frequency band independently, 2) each cooperating CR reports either the CR's local binary decision or the CR's observation value directly to the fusion center (FC) 70 over the reporting channel, 3) the fusion center fuses all the received data (or decisions) to infer the presence or absence of the PU, and transmits the decision result to the CRs.

Figure 9:
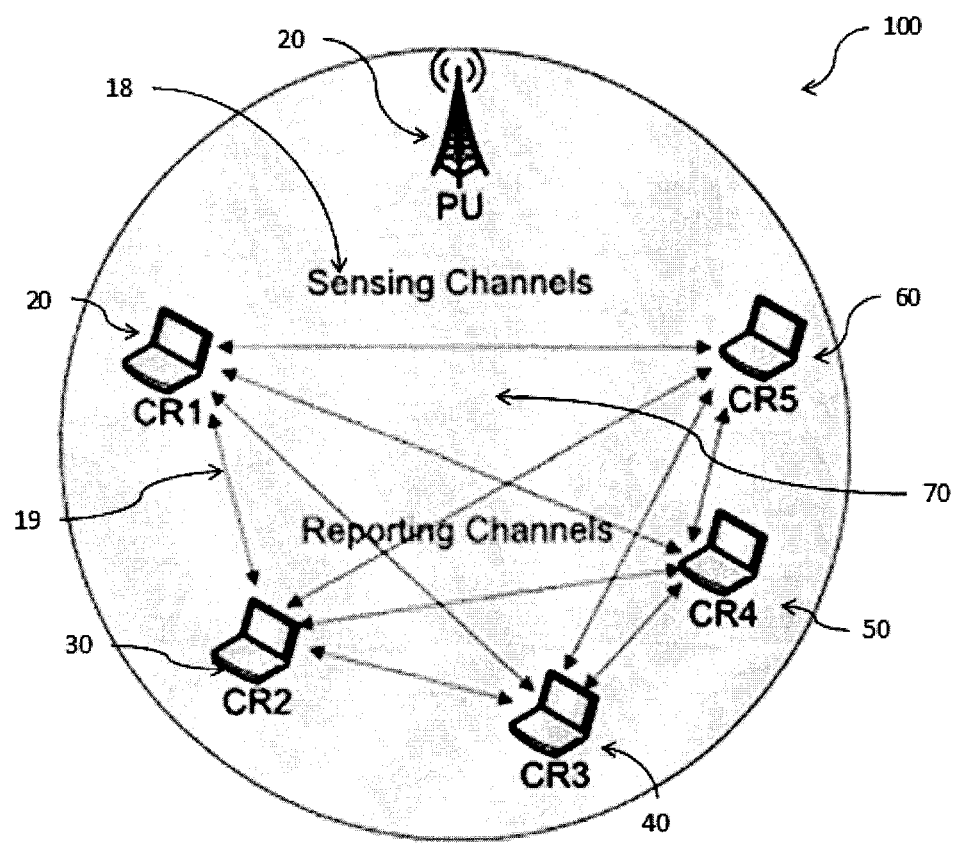
FIG. 9 is a schematic of the cooperative spectrum sensing (CSS) network for cognitive radio using a distributed architecture.

The FC can be located many places and called by many different names including: common receive, master node, base station, combining node, designated controller. In FIG. 9 a distributed network is shown in contrast to the centralized network shown in FIG. 8. The principle of operation is the same for a distributed network except each node (CR) incorporates all the functions of the FC.

As shown in FIG. 8, CR0(FC) 70 is the FC while CR1-CR5, 20, 30, 40, 50, and 60, are the cooperating CRs. When using cooperation among multiple CRs for spectrum sensing, certain protocols need to be defined for the purpose of sharing sensing information over the reporting channel 19 (in contrast to the reporting channel, the physical point-to-point connection between the PU and a CR for the purpose of sensing the PU's signal is called a sensing channel 18). Different architecture can be used for the reporting channel 19 such as ISM band and ultra wide band (UWB) as discussed in C. Guo, T. Zhang, Z. Zeng, and C. Feng, "Investigation on Spectrum Sharing Technology Based On Cognitive Radio," in 2006 *First International Conference on Communications and Networking in China*, 2006, pp. 1-5, herein incorporated by reference in its entirety, and J. Perez-Romero, O. Salient, R. Agusti, and L. Giupponi, "A Novel On-Demand Cognitive Pilot Channel Enabling Dynamic Spectrum Allocation," in 2007 *2nd IEEE International Symposium on New Frontiers in Dynamic Spectrum Access Networks*, 2007, pp. 46-54, herein incorporated by reference in its entirety. Alternatively, the reporting channel can use a simple protocol using time division multiple access (TDMA) to share the sensing information with the FC, where the cooperating CRs are divided into clusters based on their geographical location and send their sensing data to the particular cluster head only during the assigned time slots, as discussed in P. Pawelczak, C. Guo, R. V. Prasad, and R. Hekmat, "Clusterbased spectrum sensing architecture for opportunistic spectrum access networks," in *IEEE Vehicular Technology Conference VTC*2007, 2007, herein incorporated by reference in its entirety.

It is very important to consider that the cooperation mechanism should have as low as possible overhead, and it should be robust to network changes and failures. Also, the amount of delay needs to be minimized for a particular cooperation algorithm. Usually, such type of protocols are defined at Medium Access Layer (MAC) as discussed in L. Musavian and T. Le-Ngoc, "Cross-layer design for cognitive radios with joint AMC and ARQ under delay QoS constraint," in 2012 *8th International Wireless Communications and Mobile Computing Conference (IWCMC)*, 2012, pp. 419-424, herein incorporated by reference in its entirety.

When the CRs report a local binary decision to the FC and the FC combines these local binary decisions to obtain the final decision, the FC process of combining local decisions from the CRs to obtain a final decision is called decision fusion (also known as hard combination). When the CRs report observation values, such as the received energy value that each CR independently measures when receiving signals from the sensing channel, and the FC combines the local observation values from each CR to obtain a final decision, the process is called data fusion in contrast to decision fusion. The local decision at the CR network nodes are called hard decisions for the decision fusion method and are called soft decisions when the received energy value is reported in the data fusion method. Data fusion requires greater reporting channel bandwidth than for decision fusion which uses only a single binary value to report the result for a given frequency band. Although, data fusion imposes large amount of communication overhead over the reporting channel, it has better detection performance than decision fusion in low signal-to-noise-ratio environment, as discussed in J. Ma, G. Y. Li, and B. H. Juang, "Signal processing in cognitive radio," *Proceedings of the IEEE*, vol. 97, no. 5, pp. 805-823, 2009, herein incorporated by reference in its entirety. By combining decision fusion and data fusion into a hybrid decision-data fusion method at the FC and employing bi-threshold energy detectors at each CR node in the CR network to measure the sensing channel, the CR network experiences most of the improved detection benefits of using a data fusion method, but with the lower overhead of a using decision fusion method.

Figure 10:
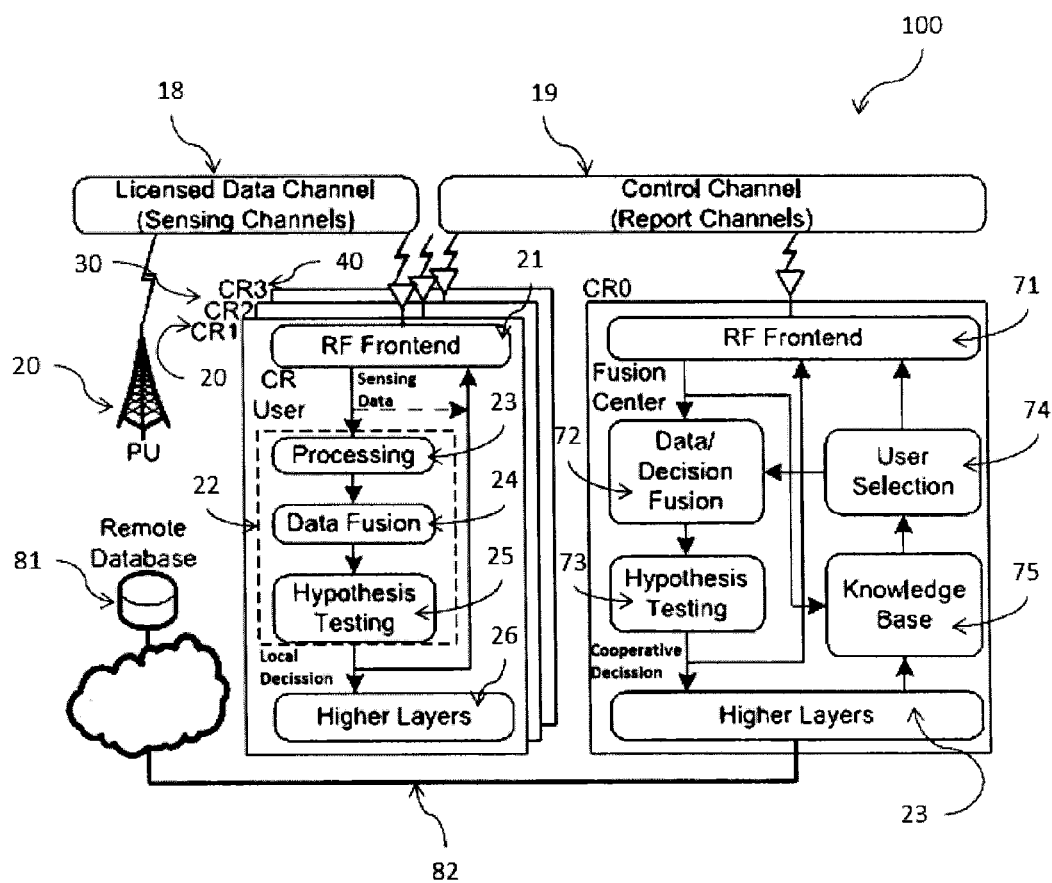
FIG. 10 is a schematic of a cooperative spectrum sensing network of cognitive radio users with a centralized architecture.

At the physical layer, the framework of the centralized cooperative spectrum sensing CSS can be represented as shown in FIG. 10. As discussed in I. F. Akyildiz, B. F. Lo, and R. Balakrishnan, "Cooperative spectrum sensing in cognitive radio networks: A survey," *Physical Communication*, vol. 4, no. 1, pp. 40-62, March 2011, herein incorporated by reference in its entirety, the framework consists of the PU 11, cooperating CRs 20, 30, and 40, FC 70, the sensing channel 18, the reporting channel 19, and an optional external database 81, which may be located remotely.

As shown in the framework, a group of collaborative CRs, presumably independent of each other, perform targeted sensing using their RF frontend 21. The processing unit 22 of a CR may include, among other things, a signal processor 23, data fusion 24 and hypothesis testing entities 25. The RF frontend 21 is capable to be configured for data transmission or local sensing. Besides that, analog-to-digital conversion will also be done by the RF frontend 21. The local observations of the cooperating CRs can directly be transmitted to the FC 70, or it can be locally processed at each CR to provide a decision to the FC 70. Usually, certain amount of processing on the local observations is needed to minimize the bandwidth requirement over the reporting channels. The processing may include the evaluation of the energy statistics and thresholds. When the local decision or the observations are ready, a request to a higher layer (e.g., MAC layer) is sent to acquire the access of a control channel. The FC 70 in the centralized CSS framework can be a powerful cooperating CR which has all the capabilities as the other CRs. In addition, the FC 70 can have other functionalities, such as user selection 74 and knowledge base 75, to undertake the cooperation tasks successfully. Based on the requirement and the ability of the FC, the FC can be connected to an external database 81 through an ultra-high speed communication medium 82 (e.g., fiber optics). This external database 81 will assist the FC and can provide information regarding the PU 20 activity and spectrum holes.

The proposed method of spectrum sensing to detect spectrum holes uses both a frequency-domain method and a time-domain method. The frequency-domain method finds the boundaries between frequency bands allocated to PUs by detecting discontinuities in the power spectral density PSD. Each CR estimates the PSD at its position by measuring the sensing channel and performing well known processing steps on the resultant measurements. The time-domain method also uses measurements of the sensing channel, but considers separately each frequency band defined by the frequency boundaries found using the frequency-domain method. In the time-domain method, for each frequency band the energy is measured for a time interval to obtain a received energy value. The received energy value is evaluated and if the CR is part of a cooperating network of CRs the evaluation is communicated to a fusion center where the final decision is made about whether the frequency band is being used; or if the CR is acting independently, the CR makes a decision based on the received every value whether the frequency band is used.

In one non-limiting embodiment of the time-domain method, a hybrid data-decision fusion method is used for cooperative spectrum sensing (CSS) in cognitive radio oriented wireless networks (CROWN) in which we combine hard decisions and soft decisions. A two-threshold energy detector is used at each CR to classify it as either a hard-decision CR (HDCR) or a soft-decision CR (SDCR). While the HDCRs transmit a binary decision to the fusion center, the SDCRs transmit the received energy value.

Figure 15:
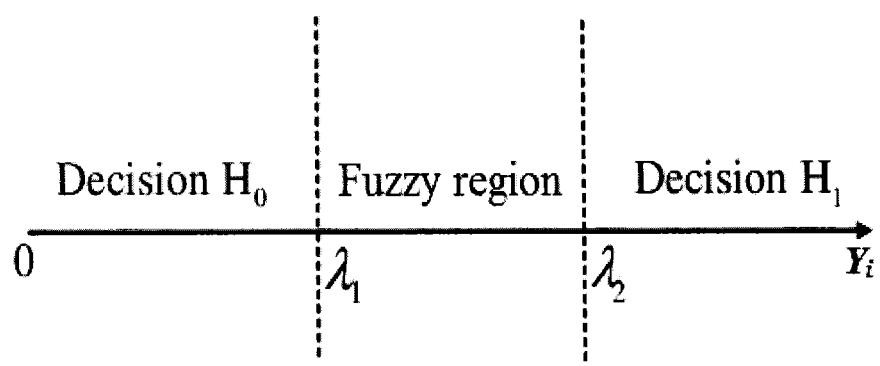
FIG. 15 is a schematic showing a bi-threshold energy detector, where a hard decision of $H_1$ is made for signals $Y_i$ greater than the second threshold $\lambda_2$, a hard decision of $H_0$ is made for signals $Y_i$ less than the second threshold $\lambda_2$, and a soft decision is made for signals $Y_i$ in the fuzzy region between the first threshold $\lambda_1$ and the second threshold $\lambda_2$.

We consider a centralized CSS network with N CRs. Each of the cooperating CRs uses a bi-threshold energy detector, as shown in FIG. 15. The two thresholds $\lambda_1$ and $\lambda_2$ are used to measure the reliability of the decision on the received energy value, $Y_i$. The received energy value, $Y_i$, can fall in one of three regions as shown in FIG. 15. If $Y_i$ is less than $\lambda_1$, "Decision $H_0$" is sent, while if $Y_i$ exceeds $\lambda_2$, "Decision $H_1$" is sent. The fuzzy region models the situation where the energy value is not reliable enough for the CR to make a hard decision. The CRs whose received energy falls in the fuzzy region would directly report their received energy to the fusion center (FC) 70. Finally, the FC 70 combines all the soft- and hard-decisions into a single final decision—deciding whether the frequency band is used or not used.

Figure 13:
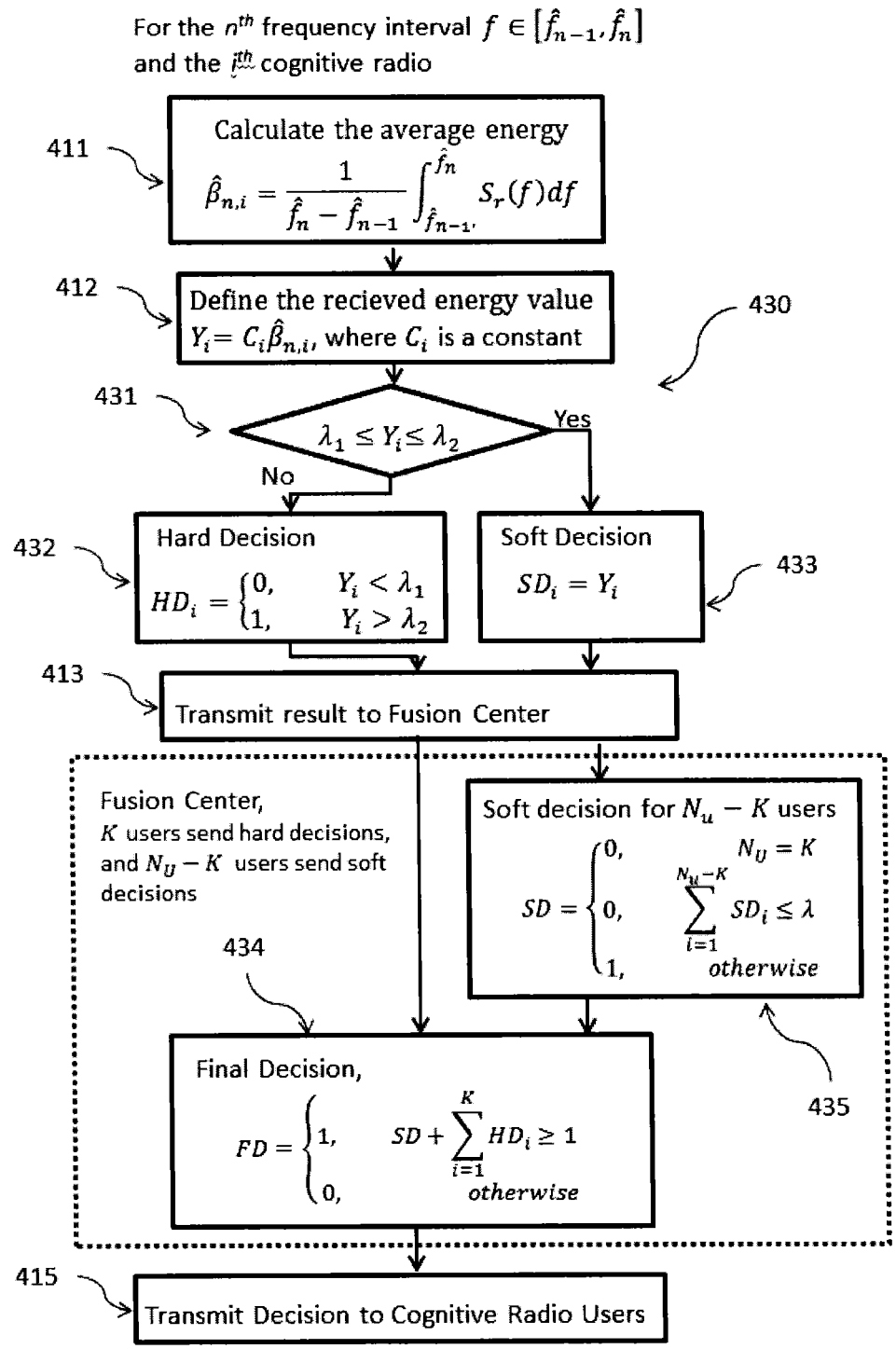
FIG. 13 is a flow diagram for the hybrid data-decision fusion method for a cooperative spectrum sensing for a network of cognitive radios users in order to determine if the frequency band in being used.

A flow chart of the hybrid data-decision fusion method is shown in FIG. 13. The hybrid data-decision fusion method is performed using these steps:

1) Each of the N cooperating CRs performs independent spectrum sensing of the targeted frequency band and, based on the received energy value, $Y_i$, sends either its hard-decision ($HD_i$), $H_0$ or $H_1$, or the received energy value $Y_i$ to the fusion center. The fusion center (FC) thus receives the following types of information from each CR:

$$FC_i = \begin{cases} Y_i, & \lambda_1 < Y_i < \lambda_2 \\ HD_i, & \text{otherwise} \end{cases},$$

$$i = 1, 2, \ldots N$$

where, the hard decision $HD_i$ can be either $H_0$ (absent) at which case a binary 0 will be transmitted or $H_1$ (present) at which case a binary 1 will be transmitted.

$$HD_i = \begin{cases} 0, & O \leq Y_i \leq \lambda_1 \\ 1, & Y_i \geq \lambda_2 \end{cases}.$$

2) Suppose now that K out of $N_u$ cognitive users report HDs, and $N_U$-K users report energies to the fusion center. The fusion center will first take an initial decision (soft decision) by adding all the reported raw energies from $N_U$-K users using EGC scheme as discussed in F. F. Digham, M. S. Alouini, and M. K. Simon, "On the energy detection of unknown signals over fading channels," in *IEEE International Conference on Communications*, 2003. ICC '03., 2003, vol. 5, pp. 3575-3579, herein incorporated in its entirety by reference. The soft decision (SD) is represented as follows:

$$SD = \begin{cases} 0, & 0 \le \sum_{i=1}^{N-K} Y_i \le \lambda \\ 1, & \sum_{i=1}^{N-K} Y_i \ge \lambda \end{cases},$$

where λ used in soft decision can be calculated using Eq. (10) from F. F. Digham, M.-S. Alouini, and M. K. Simon, "On the Energy Detection of Unknown Signals Over Fading Channels," *IEEE Transactions on Communications*, vol. 55, no. 1, pp. 21-24, January 2007, herein incorporated in its entirety by reference.

3) The fusion center will then make the final decision (FD) as follows:

$$FD = \begin{cases} 1, & SD + \sum_{i=1}^{K} HD_i \ge 1 \\ 0, & \text{otherwise} \end{cases}$$

Hence, the fusion center will assume that the targeted frequency band is available for secondary usage only if the combination of hard- and soft-decision is equal to 0.

Figure 2:
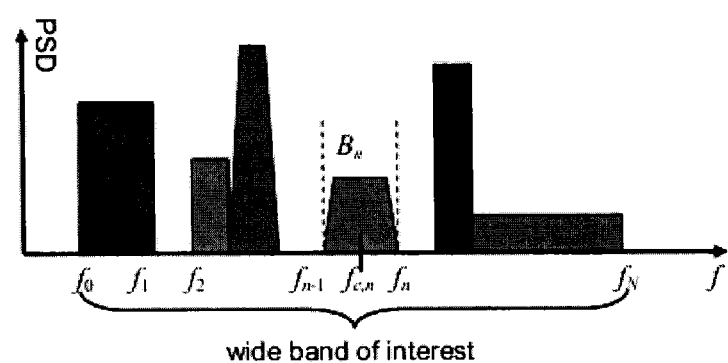
FIG. 2 is a frequency diagram of a notional power spectral density (PSD) in a "wide band of interest" for cognitive radio, where the horizontal axis shows frequency and the vertical axis shows the PSD.
Figure 3:
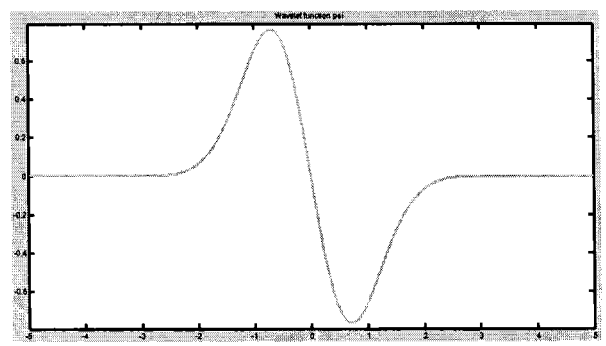
FIG. 3 is a plot of Gaussian wavelet, where the vertical axis is the amplitude, and the horizontal can be either time, frequency, distance, etc. depending on the application

Accurate detection of holes in the spectrum (white spaces) is still a very challenging task partially due to the challenge of identifying the boundaries between frequency band in the absence of prior knowledge about the frequency bands. The wavelet transform (WT) method is robust and computationally efficient in wideband spectrum sensing. It allows the CR to quickly and accurately identify the number of subbands within the wide band of interest shown in FIG. 2.

The frequency-domain method for finding edges to frequency bands is discussed in Z. Tian and G. B. Giannakis, "A Wavelet Approach to Wideband Spectrum Sensing for Cognitive Radios," in 2006 1*st International Conference on Cognitive Radio Oriented Wireless Networks and Communications*, 2006, pp. 1-5 to avoid spurious wavelet transform coefficients due to noise. Noise in the estimated PSD sometimes results in sharp features in the frequency domain resembling the edge of a frequency band being used by a PU. While using wavelet smoothing functions smooth out much of the sharp spectral features due to noise, more can be done. The frequency-domain method uses median filtering on the estimated PSD to smooth the PSD before calculating the wavelet transform coefficients. After calculating the wavelet transform coefficients, a noise threshold is calculated for the wavelet transform coefficients, and all wavelet transform coefficients below the threshold are set to zero. Additionally, by taking the multi-scale sum of the wavelet transform coefficients for different scales, uncorrelated wavelet transform coefficients corresponding to noise are suppressed by averaging such that it is easier to distinguish between frequency band boundaries and noise.

Figure 14:
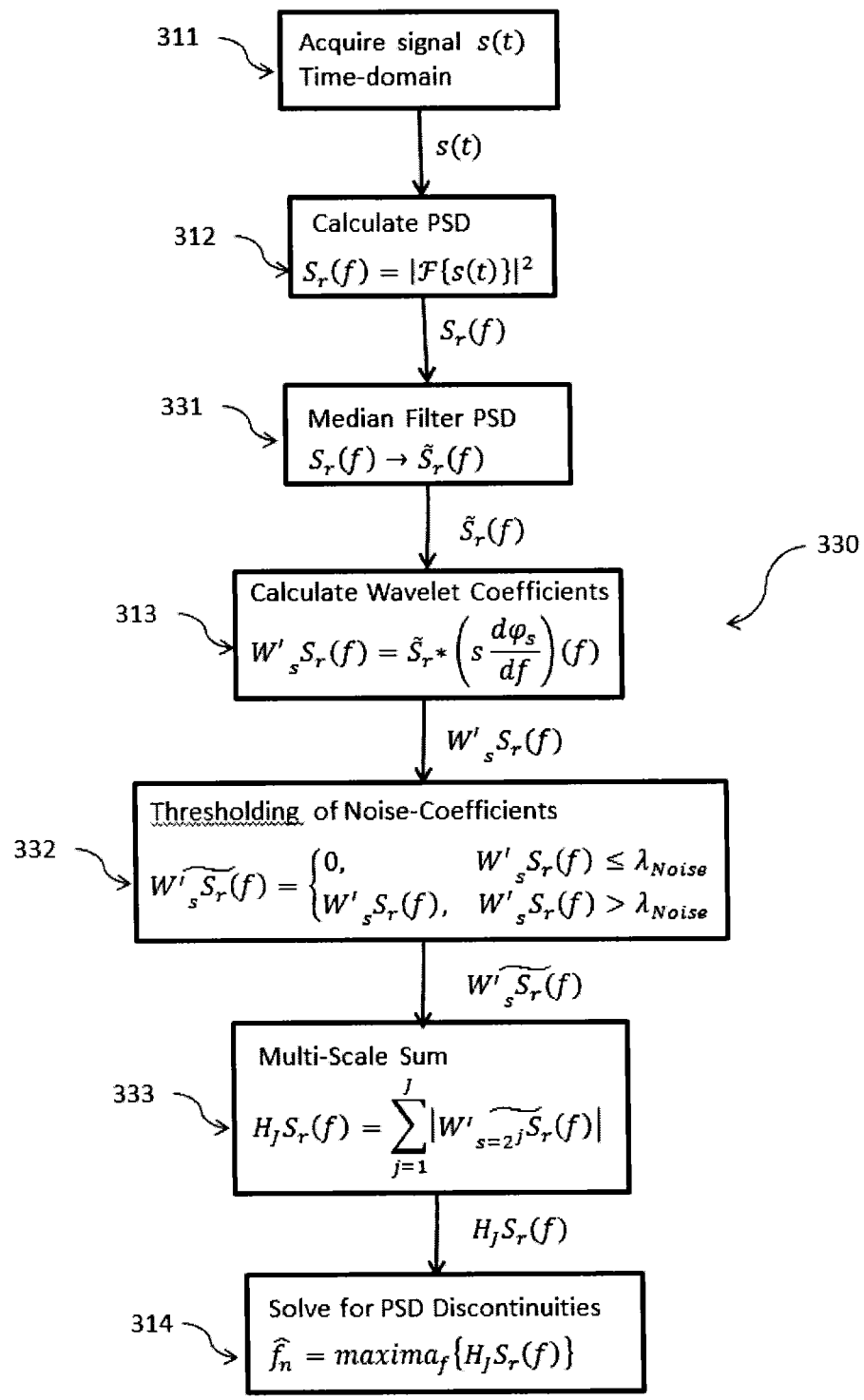
FIG. 14 is a flow diagram for the improved frequency domain method for detecting boundaries between frequency bands allocated to PUs, the detection resulting from finding discontinuities in the power spectral density, the method including the improvements of a median filtering step, a thresholding step, and a multi-scale sum step.

FIG. 14 shows a flow chart of the steps in the frequency-domain process including: acquiring a time domain signal 311, estimating the PSD 312, median filtering the PSD 331, calculating wavelet transform coefficients 313, suppressing wavelet transform coefficients below the noise coefficient threshold 332, performing a multi-scale sum of the wavelet transform coefficients 333, and solving for PSD discontinuities 314.

There will always be some Gaussian (thermal) noise disturbance at the receiver. In order to cope with it, we propose to apply Median Filtering to the received signal's PSD $S_r(f)$ before calculating the wavelet transform coefficients. Median filter is a nonlinear digital filtering technique used to remove noise from a signal while preserving the edges of the image or signal. Median filtering technique applies sliding window to a sequence, where the sliding window runs through the entire signal entry by entry, replacing the center value in the window with the median value of all the other points in the window as discussed in M. Gabbouj, E. J. Coyle, and N. C. Gallagher, "An overview of median and stack filtering," *Circuits Systems and Signal Processing*, vol. 11, no. 1, pp. 7-45, March 1992, herein incorporated by reference in its entirety. While performing the median filtering operation over a noisy sequence, typically, the sliding window is assumed to be of odd length, i.e., having a width of 2N+1, where N is some positive integer. At a particular instant, suppose the window is centered at sample k in the input sequence, then the time-ordered window of 2N+1 points can be specified in the vector form as:

$(x_{k-N}, x_{k-N+1}, \ldots, x_k, \ldots, x_{k+N})$

The output of the median filter at the time when the window is centered at sample k in the input sequence, denoted as $y_k$, can be represented as:

$y_k = \text{median}(x_{k-N}, x_{k-N+1}, \ldots, x_k, \ldots, x_{k+N})$

The samples in the window are first reordered based on their rank (magnitude):

$(x_{(1)}, x_{(2)}, \ldots, x_{(2N+1)})$ where $x_i$ denoted the sample of the $i^{th}$ rank. For example, if N=2, and the time-ordered samples in the sliding window are:

$(x_{k-N}, x_{k-N+1}, \ldots, x_k, \ldots, x_{k+N}) = (8,1,6,4,1)$ then the rank ordered samples would be:

$(x_{(1)}, x_{(2)}, x_{(3)}, x_{(4)}, x_{(5)}) = (1,1,4,6,8)$

Thus the median filter output for this example would simple be $y_k = x_{(3)} = 4$. The same procedure would be repeated for all the input signal samples.

Figure 16:
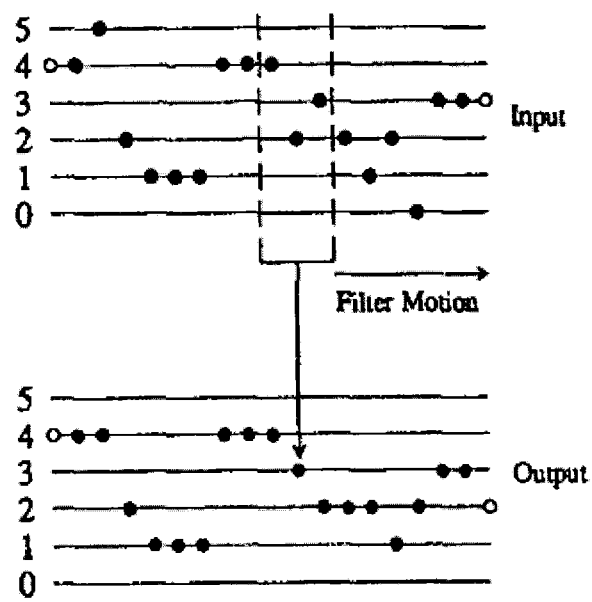
FIG. 16 is a plot showing the operation of median filter of order 3 as discussed in L. Rabiner, M. Sambur, and C. Schmidt, "Applications of a nonlinear smoothing algorithm to speech processing," *IEEE Transactions on Acoustics, Speech, and Signal Processing*, vol. 23, no. 6, pp. 552-557, December 1975.
Figure 17:
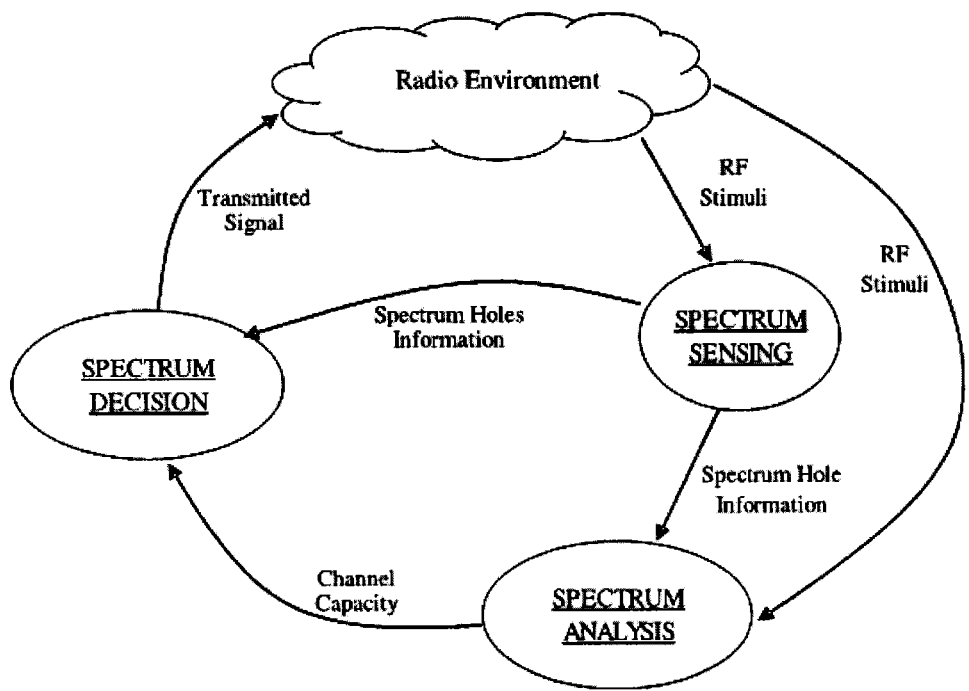
FIG. 17 is a schematic showing a simple representation of a cognitive radio cycle as discussed in I. F. Akyildiz, W.-Y. Lee, M. C. Vuran, and S. Mohanty, "NeXt generation/dynamic spectrum access/cognitive radio wireless networks: A survey," *Computer Networks*, vol. 50, no. 13, pp. 2127-2159, September 2006.
Figure 18:
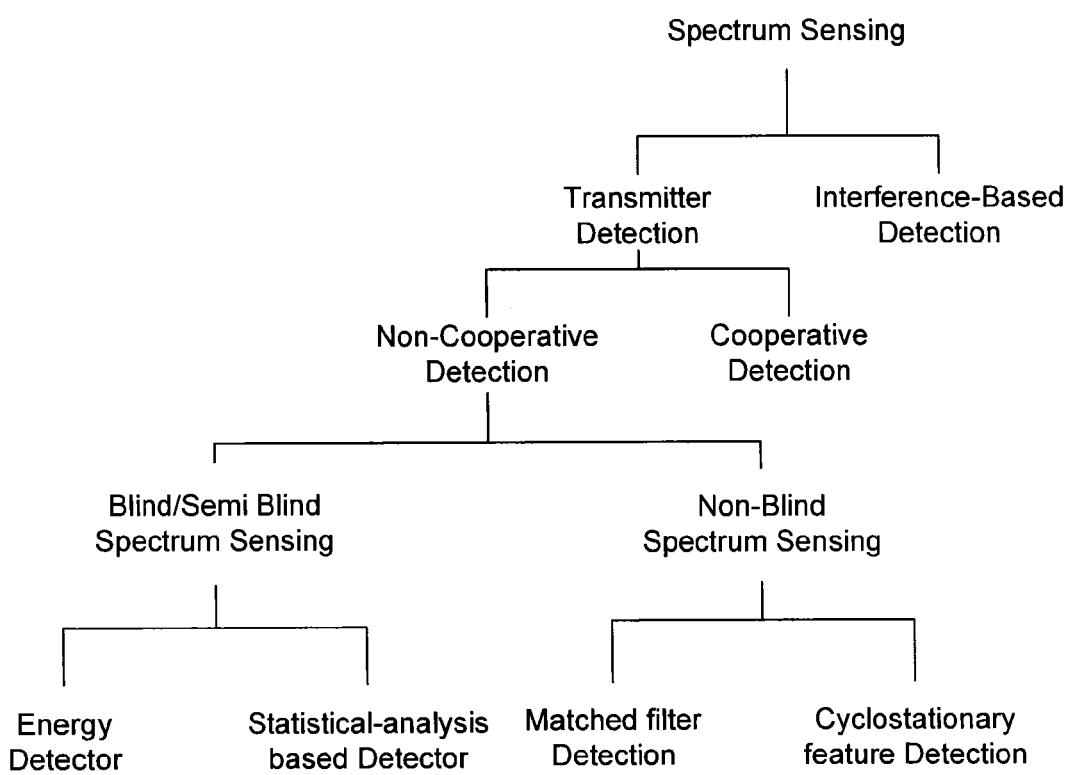
FIG. 18 is branch chart showing the classification of spectrum sensing techniques.
Figure 19:
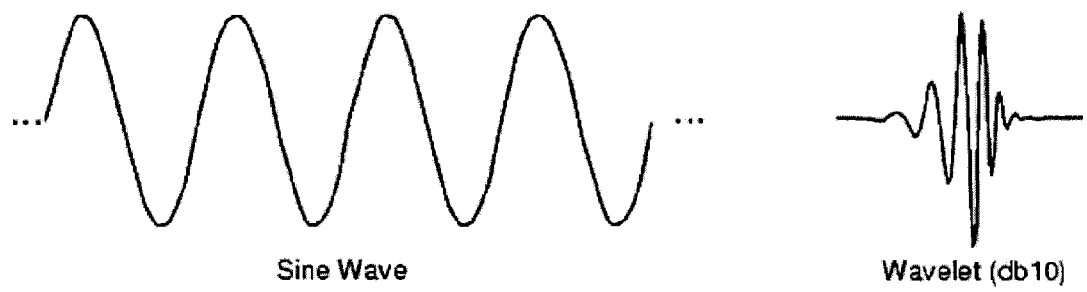
FIG. 19 is a plot showing a comparison of Fourier transform and Wavelet transform basis functions
Figure 20:
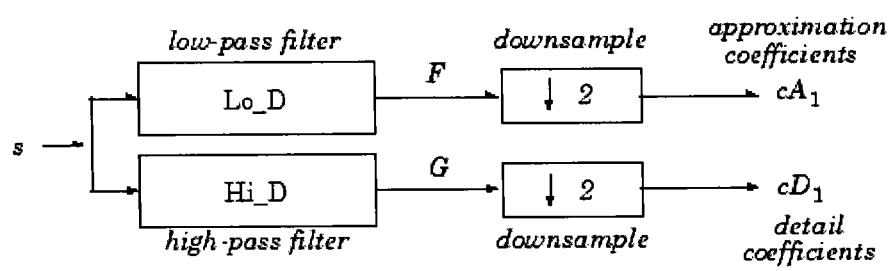
FIG. 20 is a diagram showing the first step computation steps for efficient wavelet decomposition as described in S. G. Mallat, "A theory for multiresolution signal decomposition: the wavelet representation," *IEEE Transactions on Pattern Analysis and Machine Intelligence*, vol. 11, no. 7, pp. 674-693, July 1989, herein incorporated by reference in its entirety, and G. Strang and T. Nguyen, *Wavelets and Filter Banks*, 2nd ed. Wellesley College, 1996, p. 520, herein incorporated by reference in its entirety.
Figure 21:
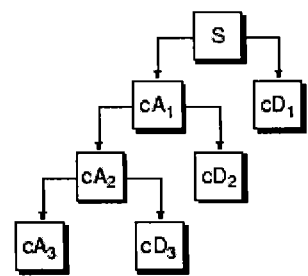
FIG. 21 is a branching chart showing a multiple-level wavelet decomposition tree.
Figure 22:
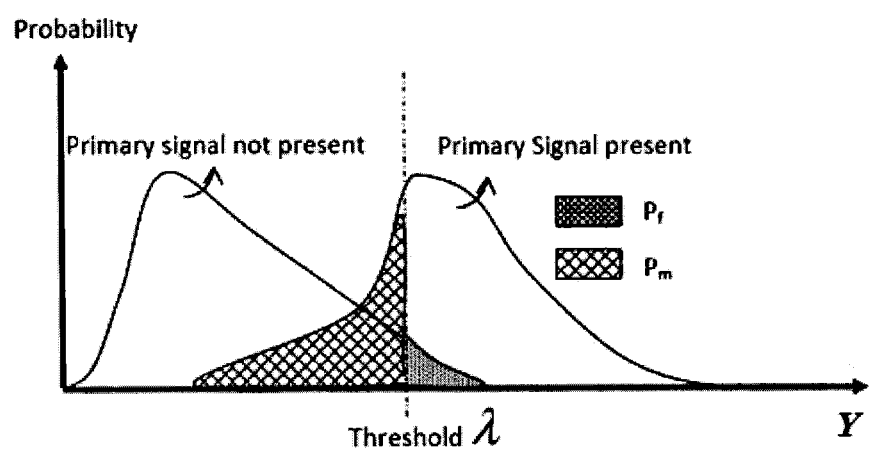
FIG. 22 is a plot showing graphically the definitions for probability of missed detection and probability of false alarm. The plot also provides a notional example of the decision trade-offs for the choice of threshold.
Figure 23:
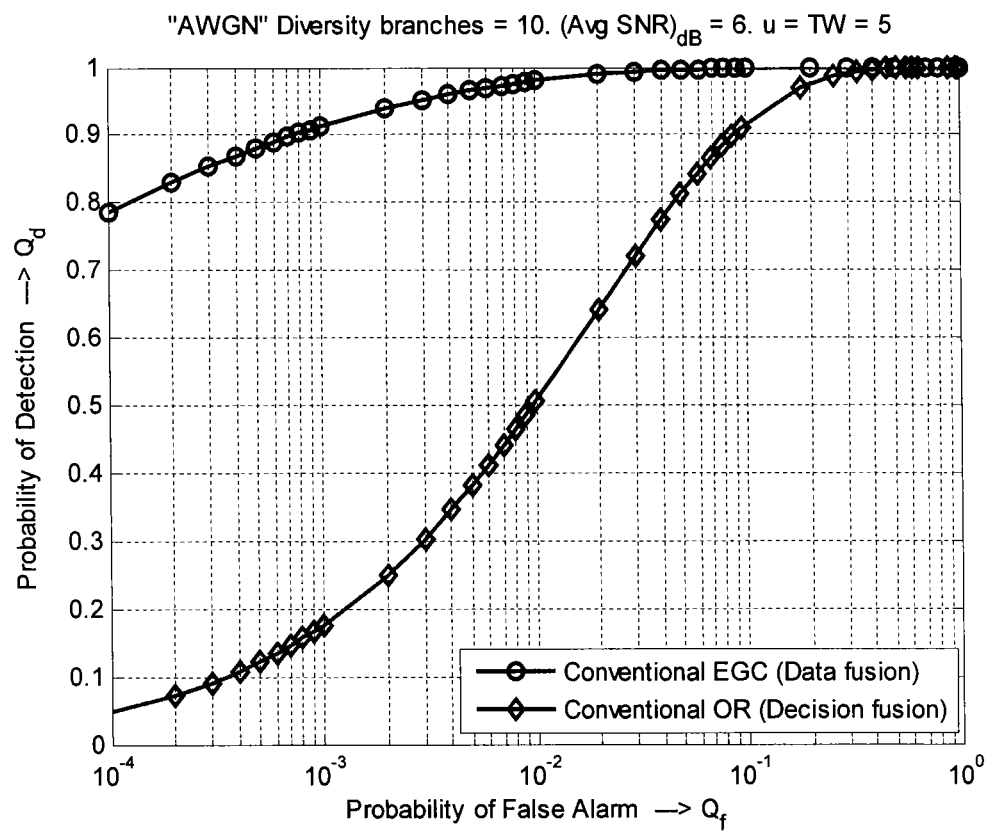
FIG. 23 is a plot showing receiver operating characteristics (ROCs) for data fusion using OR rule versus decision fusion using equal gain combining (EGC) under additive white Gaussian noise (SNR=6 dB).
Figure 24:
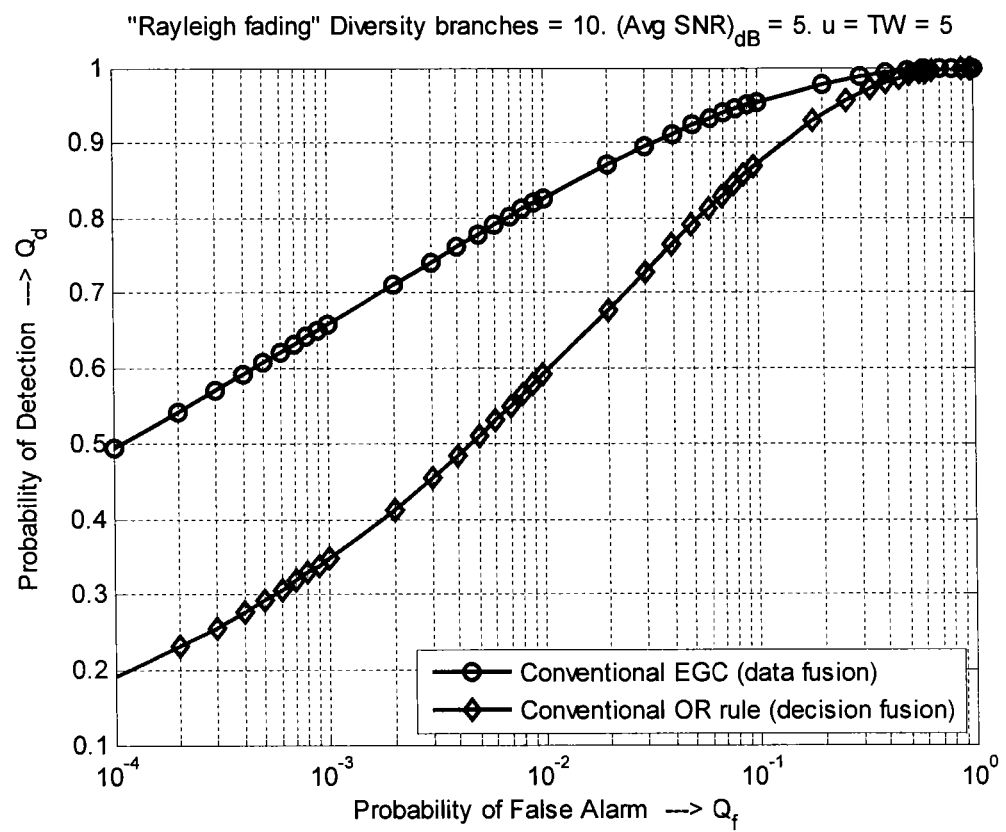
FIG. 24 is a plot showing receiver operating characteristics (ROCs) for data fusion using OR rule versus decision fusion using equal gain combining (EGC) under Rayleigh fading (SNR=5 dB).

FIG. 16 shows the operation of a median filter of order 3. As mentioned before, one of the key properties of a median filter is that it does not smear out sharp edges of a square input signal, as long as the duration of the square creating the edge exceeds some critical duration as discussed in L. Rabiner, M. Sambur, and C. Schmidt, "Applications of a nonlinear smoothing algorithm to speech processing," *IEEE Transactions on Acoustics, Speech, and Signal Processing*, vol. 23, no. 6, pp. 552-557, December 1975, herein incorporated by reference in its entirety. This property makes the median filter a good candidate for a signal smoother. This property can be further illustrated using a simple example. The input signal x(n) is fed into a $3^{rd}$ order median filter, where y(n) represents the output of the filter. There exists sharp irregularities in the input signal at n=6 and n=11. As shown, the output y(n) is found to be exactly the same as input signal. Even after increasing the order of median filter to 9, the output y(n) remains the same. However, increasing the filter order beyond 9 would smoothen out the discontinuity in x(n) and the output becomes flat. Hence, the selected order of the median filter is dependent on the required minimum duration of discontinuity that should be preserved.

Performing median filtering results in a smooth PSD $S_r(f)$, and consequently less spurious local extrema due to noise have been observed in the wavelet transform curves, however, we did not get rid entirely of the unwanted coefficients. Ideally, the order of the median filter is chosen using prior knowledge of the bandwidth of the narrowest band inside the wideband of interest in order to avoid loss of edge information for the narrowest frequency bands. Without prior knowledge, an iterative search can be performed by varying the filter order and using feedback on the quality of edges and spurious noise suppression to optimize the filter order.

The continuous-time wavelet transformation CWT of the PSD is calculated by convolving the PSD with the wavelet smoothing function $$\varphi_s(f) = \frac{1}{s}\varphi\left(\frac{f}{s}\right),$$

where s is the scale factor. The CWT of the PSD is given by $$W_s S_r(f) = S_r * \varphi_s(f).$$

the result of the convolution in 0 depends mainly upon the values of $S_r(f)$ in association with the specific scale used. Hence, $W_s S_r(f)$ will provide information on the local structure of $S_r(f)$. It is well understood that irregularities of a function can be well represented by its derivatives, therefore, the derivative of $S_r(f)$ smoothed by the scaled wavelet $\varphi_s(f)$ will provide the required information, and is expressed as:

$$W'_s S_r(f) = s\frac{d}{df}(S_r * \varphi_s)(f).$$

So, the local modulus maxima $W'_s S_r(f)$ (i.e., canny edge detection) represent the edges in the PSD $S_r(f)$. More formally, the identification of frequency boundaries $\{f_n\}_{n=1}^{N-1}$ can be expressed as:

$$\hat{f}_n = \text{maxima}_f\{|W'_s S_r(f)|\}, f \in [f_0, f_N],$$

where dyadic scale factors have been used, i.e., $s=2^j$, j=1, 2, . . . , J.

Before solving for the maxima of the wavelet transform coefficients (step 314 in FIG. 14), there are several methods for suppressing spurious wavelet transform coefficients due to noise. In FIG. 14 these methods are thresholding of noise-coefficients 332, and multi-scale sum 333.

The disturbance in the received signal's PSD $S_r(f)$ due to thermal noise is a challenge in estimating the exact boundaries of frequency bands allocated to PUs. The wavelet transform coefficients curves contain peaks not only due to spectrum edges, but also due noise. Consequently, it is not straightforward to extract frequency edges from CWT coefficients directly.

As shown in FIG. 14 there is a "thresholding noise-coefficients" step 332, to reduce the effects of noise. To suppress, where possible, the wavelet transform coefficient arising from noise, a noise threshold, $\lambda_{noise}$, for the wavelet transform coefficient is established. This threshold, $\lambda_{Noise}$, can be determined based on prior knowledge of the RF front end (i.e. the noise temperature of the receiver, amplifiers, etc.), calibrations or other empirical measurements and data processing. The wavelet transform coefficients are compared to the noise threshold, $\lambda_{Noise}$, and those coefficients below the noise threshold are set to zero.

As shown in FIG. 14, a "multi-scale sum" step 333, can also be employed before or after the "thresholding noise coefficients" step 332 to also mitigate the effects of noise. The "thresholding noise coefficients" step 332 could also be employed both before and after "multi-scale sum" step 333. Identification of frequency boundaries is improved by combining wavelet transform coefficients $W_s'S_r(f)$ of different scales, with the goal of suppressing the noise-induced spurious local maxima (which are random at each scale). In combining wavelet transform coefficients for different dyadic scales, the noise tends to average to zero while the coefficients corresponding to edges remain large. Previously, a multi-scale-product method was proposed as the mechanism for combining wavelet transform coefficient of different scales. However, the multi-scale-product method works poorly when the frequency bands become very narrow. Because the wavelets perform a smoothing function, wavelets with large scale factors tend to smooth together the rising and falling edges of a narrow frequency band with the undesired result that for large scales the rising and falling edges mostly cancel each other and the wavelet transform coefficients corresponding to these edges become very small, almost zero. In the multi-scale-product method, the wavelet transform coefficients are multiplicative for each scale factor. So, when the wavelet transform coefficients for a narrow frequency band are negligible at even a single scale factor, the multi-scale product for than narrow frequency band will be similarly negligible. a single the fact small for a single scale factor, then those. The multi-scale-product method gives too much weight to absence of an edge feature in the wavelet transform coefficients with large scales.

On solution to solving this problem is limiting computations to only small scales. However, higher scales have tremendous benefit in the case of non-ideal PSD in Real Channel Environment as discussed in Y.-L. Xu, H.-S. Zhang, and Z.-H. Han, "The Performance Analysis of Spectrum Sensing Algorithms Based on Wavelet Edge Detection," in 2009 *5th International Conference on Wireless Communications, Networking and Mobile Computing*, 2009, pp. 1-4, herein incorporated by reference in its entirety. At the higher scales, the smooth edges in PSD have higher correlation with the scaled wavelets and thus are more likely to be detected with the stretched wavelet.

We propose the multi-scale-sum method as an alternative to the multi-scale-product method. The multi-scale-sum method combines negligible for wavelet transform coefficients of different scales by summing the coefficients, which has the benefit of averaging our and suppressing coefficients corresponding to noise, but deemphasizes the absence of a boundary feature at any one scale factor. The multi-scale sum method combines the wavelet transform coefficients of different scales using the equation $$H_J S_r(f) = \sum_{j=1}^{J} W'_{s=2^j} S_r(f),$$

And as shown in FIG. 14 as the "multi-scale sum" step 333.

Finally, the discontinuities in the PSD are solved for by finding the maximal values of the multi-scale sum as described by the expression, $$\hat{f}_n = \text{maxima}_f\{|H_J S_r(f)|\}, f \in [f_0, f_N],$$

and as shown in FIG. 14 as the "solve for PSD discontinuities" step 314.

Figure 25:
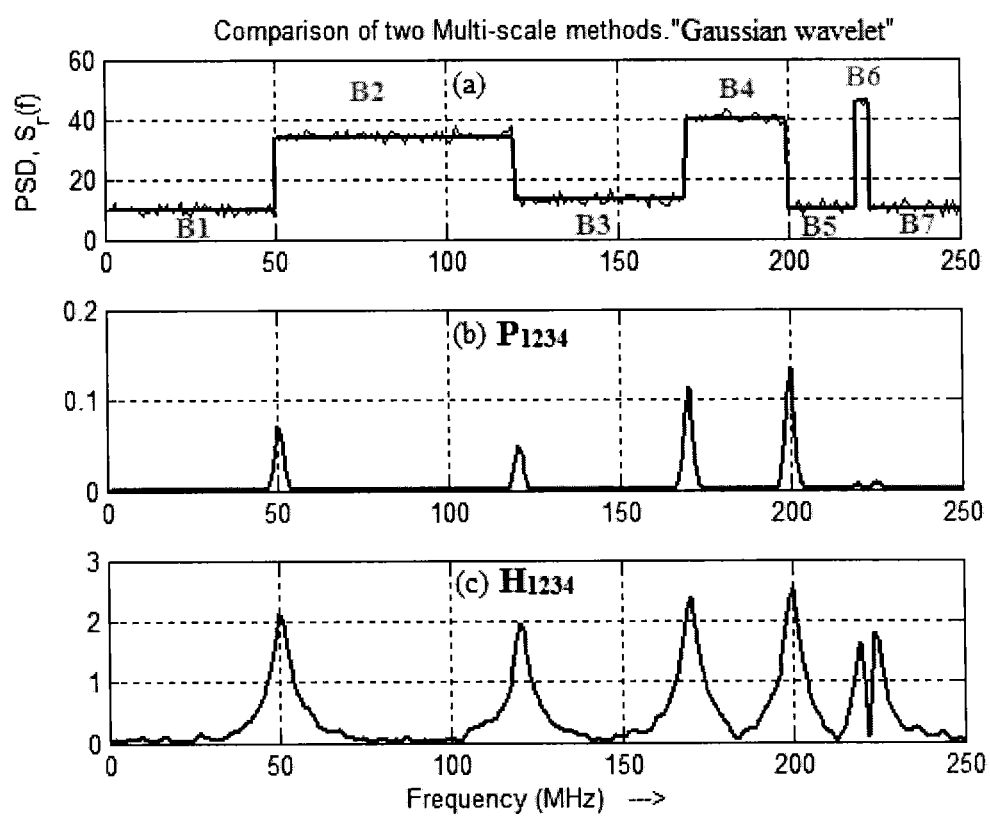
FIG. 25 is a plot showing simulated results for the (b) multi-scale-product method (i.e. $P_{1234}$) and (c) multi-scale-sum method (i.e. $H_{1234}$) of combining wavelet transform coefficients for the purpose of detecting discontinuities in the (a) power spectral density in the presence of noise. The top plot (a) shows the power spectral density in the presence of noise. The middle plot (b) shows the result of the multi-scale-product method of combining wavelet transform coefficients. The bottom plot (c) shows the result of the multi-scale-sum method of combining wavelet transform coefficients.

FIG. 25 shows a simulated PSD and the results of combining wavelet transform coefficients using the multi-scale-product method ($P_{1234}$) and the multi-scale-sum method ($H_{1234}$). Whereas, the local maxima of $P_{1234}$ corresponding to B6 are barely perceptible, the local maxima of $H_{1234}$ corresponding to B6 are clearly visible above the noise.

In addition to using the multi-scale sum method to improve detection of narrow frequency bands, the method can employ different families of wavelet smoothing functions such as the Haar and biorthogonal wavelets. These wavelets appear to have better characteristics for edge detection than the more commonly used Gaussian wavelets, which were used to obtain the simulated results in FIG. 25. When the spectrum of interest contains abrupt/sharp changes, as is the case with our simulations, the use of Haar mother-wavelet is more appropriate to capture the edges at multiple resolutions. On the other hand, Gaussian mother-wavelet was employed when the spectrum of interest exhibits smooth edges/singularities. Such smooth type of PSD is the result of either the imperfections of the RF filter in transmitter, or the multipath fading and/or Doppler effect in real channel environment.

While we have described the spectrum sensing methods in the context of cognitive radio and wireless communications, these improved spectrum sensing methods could be applied to other fields where it is important to locate discontinuities in a wide bandwidth signal, and where multiple dispersed sensors collaborate to make decision about the presence of a sensed phenomenon. For example, the methods could be used in the field of acoustics where there is a network of dispersed microphones and speakers in an environment with channel fading.

Figure 5:
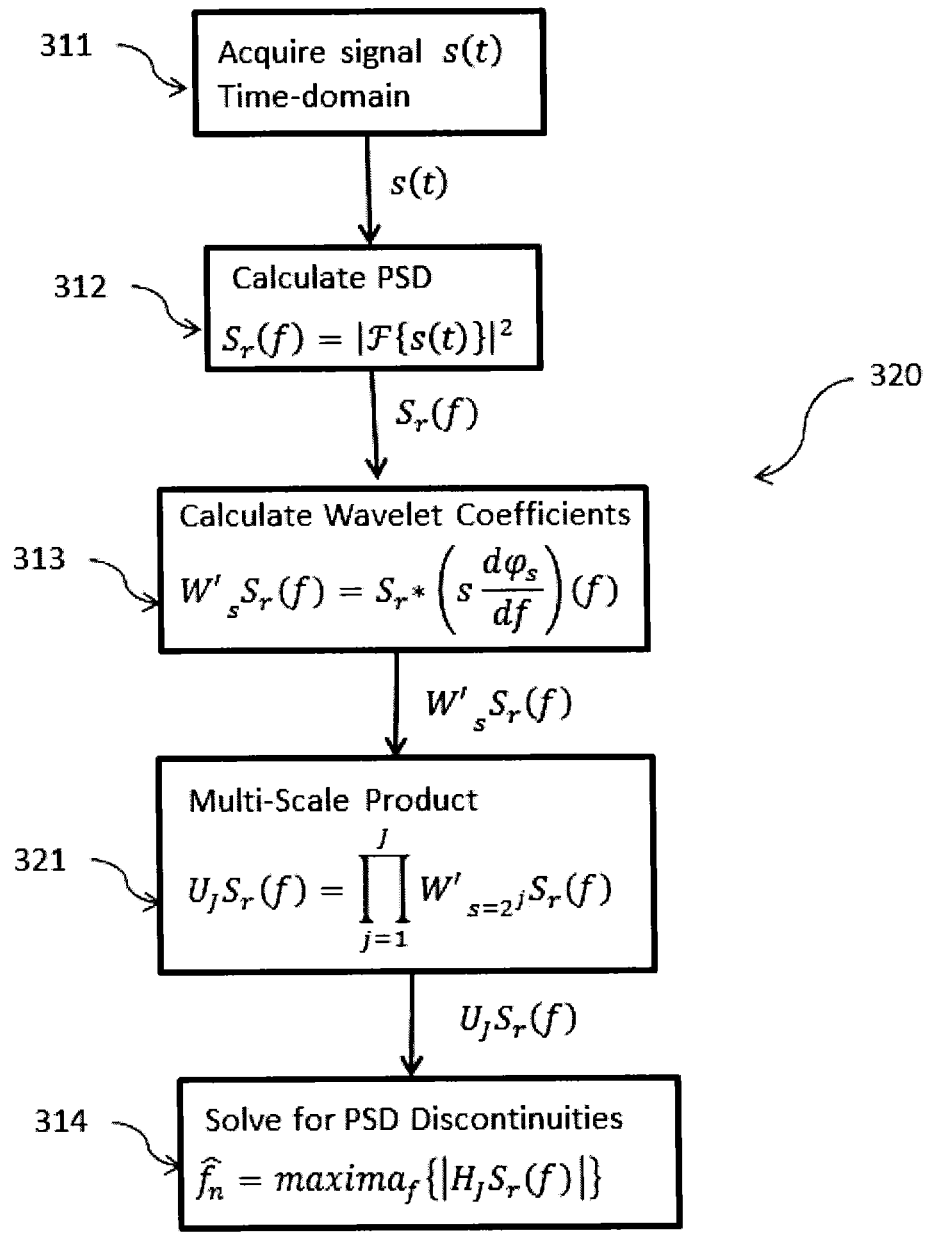
FIG. 5 is a flow diagram for the multi-scale product frequency domain method for finding discontinuities in a power spectral density, the discontinuities corresponding to the boundaries between frequency bands allocated to licensed users.
Figure 6:
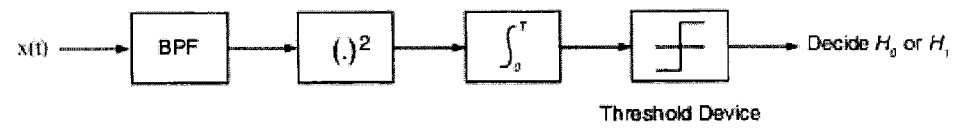
FIG. 6 is a schematic showing a single threshold energy detector.
Figure 7:
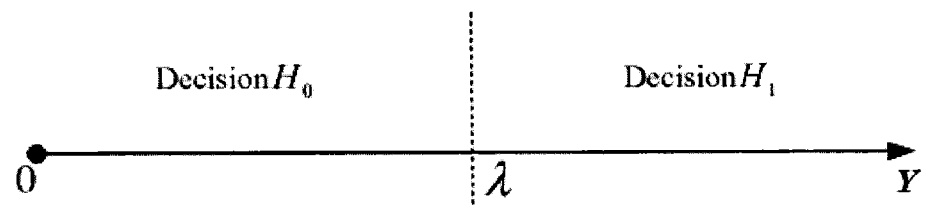
FIG. 7 is a schematic of the decision rule for a hard decision made by a single threshold energy detector.

Additionally, the suggested improvements to cognitive radio and cognitive radio networks, including using bi-threshold detectors making both hard decisions and soft decisions, a hybrid data-decision fusion method, median filtering the PSD, suppressing wavelet transform coefficients below a coefficient noise threshold, and combining wavelet transform coefficients using a multi-scale-sum method can be used all together in an improved spectrum sensing method for cognitive radio. The embodiment incorporating all of these improvements can be summarized by observing that this embodiment would include both the improved frequency-domain method shown in FIG. 5 and the improved time-domain method shown in FIG. 14. However, it will also be understood by those skilled in the art that an improved spectrum sensing method for cognitive radio can also be realized by incorporating only a subset of all of the proposed improvements. These methods incorporating various subsets of the proposed improvements are alternative embodiments of improved spectrum sensing methods.

Figure 4:
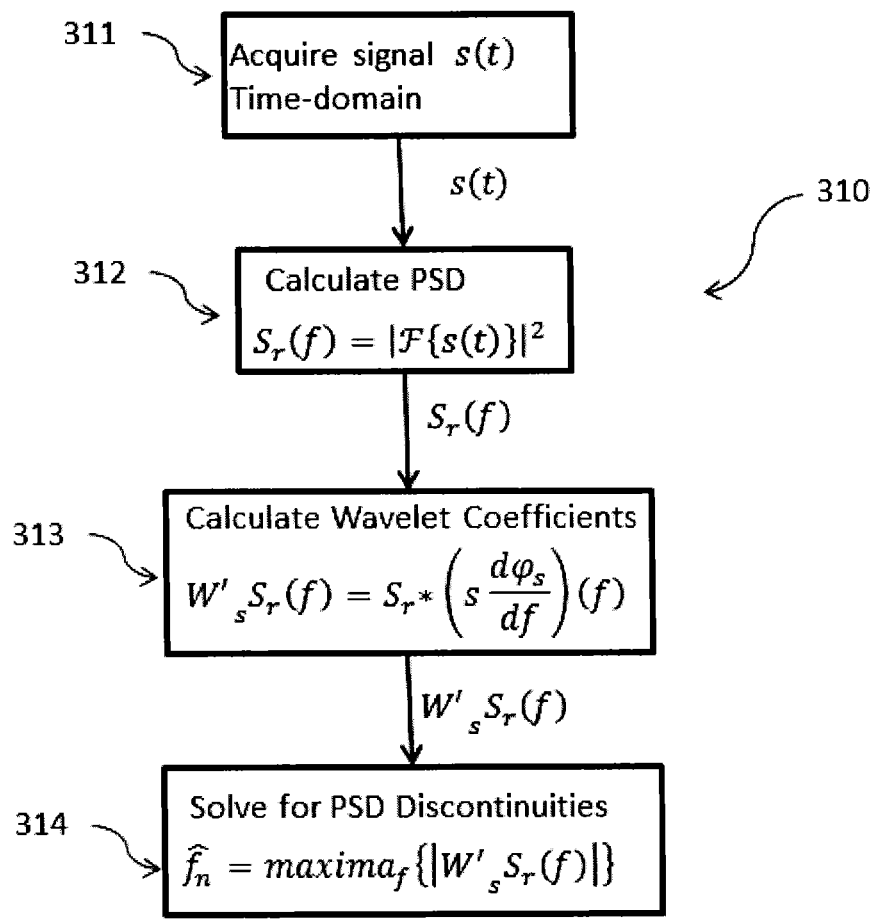
FIG. 4 is a flow diagram for the wavelet transformation frequency domain method for finding discontinuities in a power spectral density, the discontinuities corresponding to the boundaries between frequency bands allocated to licensed users.
Figure 11:
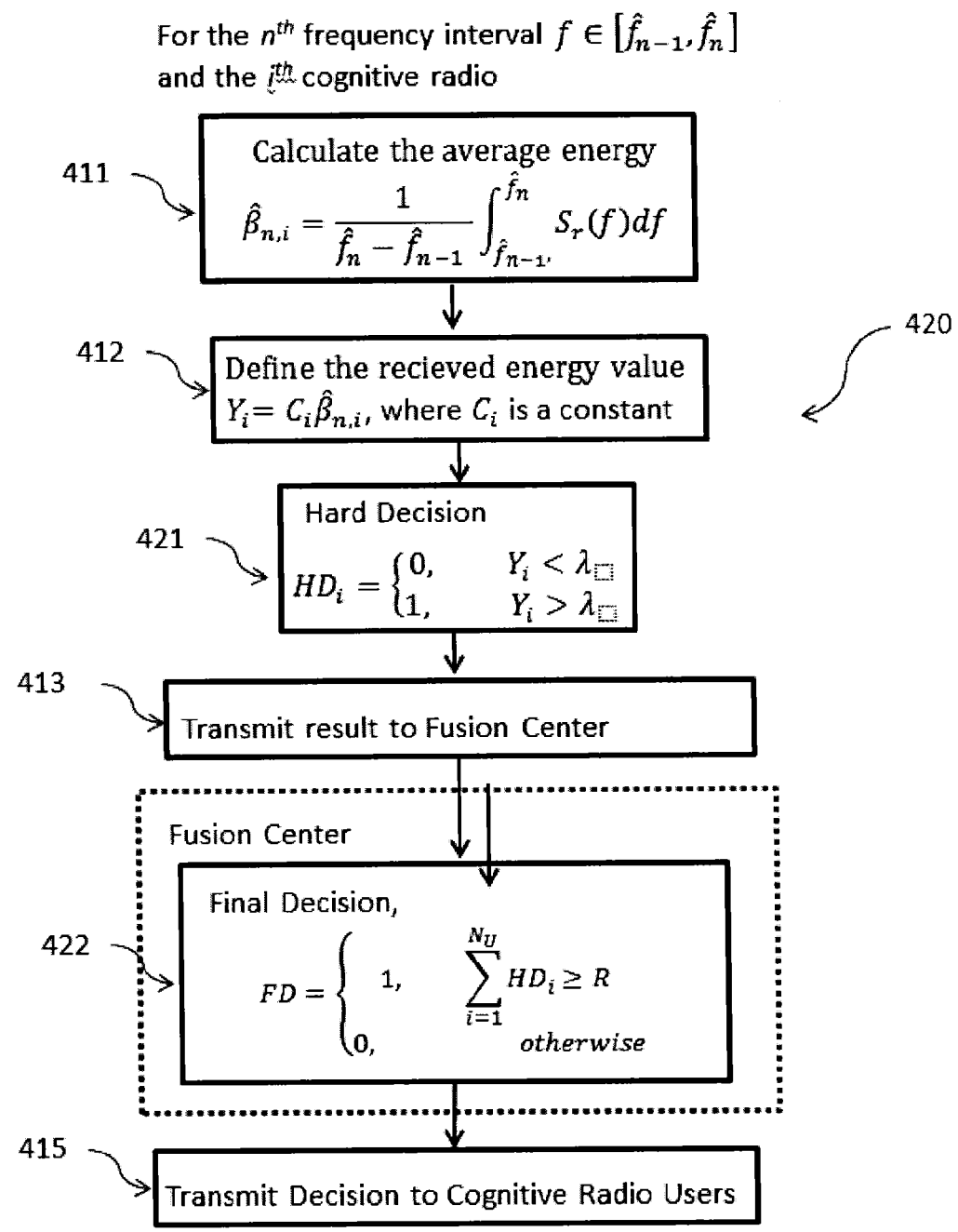
FIG. 11 is a flow diagram for the single threshold energy detection time-domain method for deciding whether a frequency band allocated to licensed user is being used the method using data fusion to base the decision on measurement results from a plurality of $N_U$ cognitive radio users (using the R out of $N_U$, also known as K our of L, decision metric).
Figure 12:
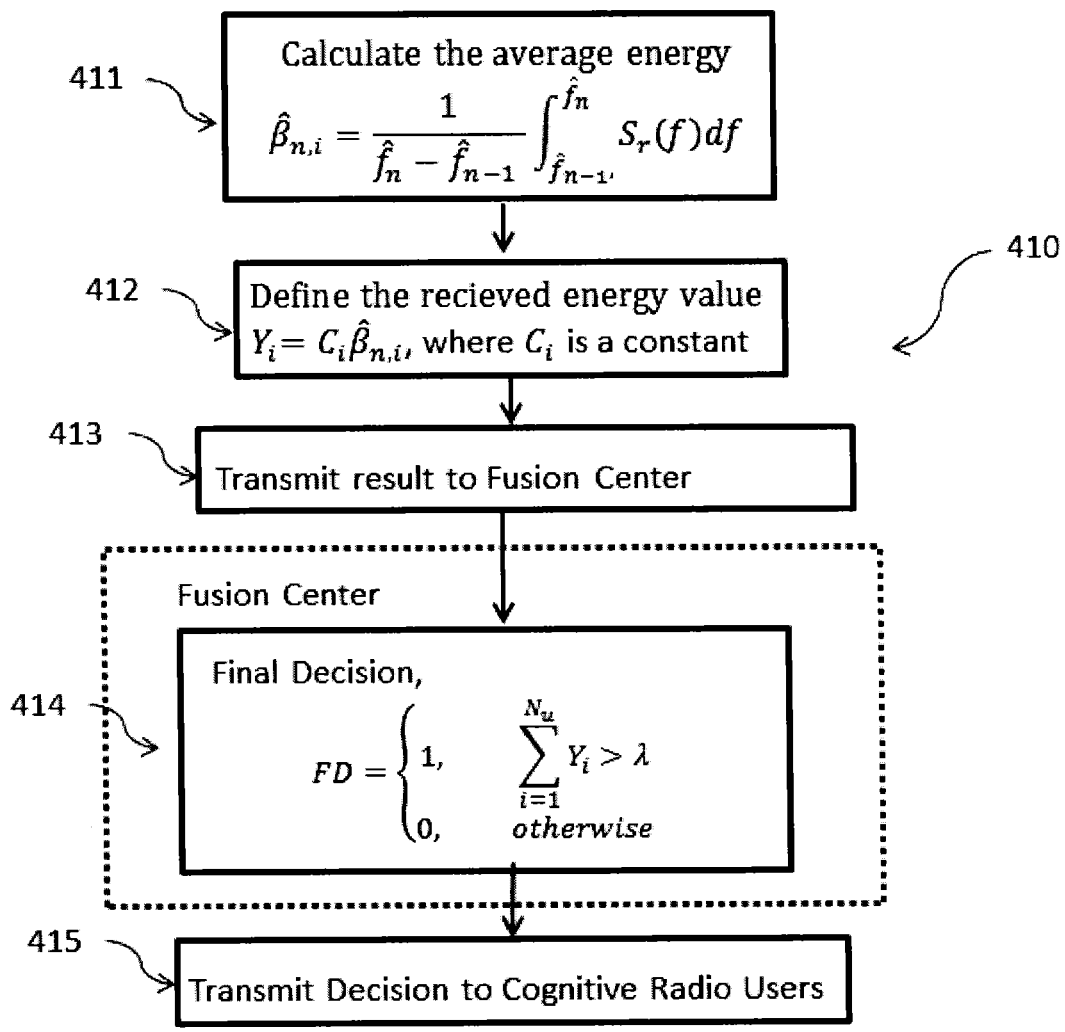
FIG. 12 is a flow diagram for the equal gain combining time-domain method for deciding whether a frequency band allocated to licensed user is being used the method using data fusion to base the decision on measurement results from a plurality of $N_U$ cognitive radio users.

For example, in a second non-limiting embodiment, the frequency domain method shown in FIG. 4 could be used with the improved time-domain method shown in FIG. 13. Additionally, a third embodiment of the method can be realized by combining the frequency-domain method shown in FIG. 5 with the improved time-domain method shown in FIG. 13. In a fourth and fifth embodiment of the spectrum sensing method, the improved frequency domain method shown in FIG. 14 can be combined with the time-domain method shown in FIG. 11, and the improved frequency domain method shown in FIG. 14 14 can be combined with the time-domain method shown in FIG. 12. Also, additional permutations of the possible embodiments can be realized by modifying an of the previous embodiments applying the improved frequency domain method shown in FIG. 14 by modifying the improved spectrum sensing method to exclude at least one the three steps in FIG. 14 of median filtering the PSD 331, thresholding of noise-coefficients, 332, and multi-scale sum 333.

These improved methods provide a frequency-domain spectrum sensing approach using the Wavelet transform, and a time-domain spectrum sensing approach using a double-threshold energy detector and cooperation among multiple single-antenna cognitive users.

The main contributions achieved in these methods are: 1) application of median filtering to the received signals' PSD to reduce the effects of noise in wavelet-based spectrum sensing, 2) improving the overall wavelet edge detection results by combining wavelet coefficients from different scales. The detected edges are used to find the spectral holes, 3) comprehensive analysis of different mother wavelets and their performance in spectrum sensing, development of a new hybrid two-threshold energy detector based spectrum sensing algorithm to reduce the cost over the reporting channels under cooperative spectrum sensing scenario.

Figure 26:
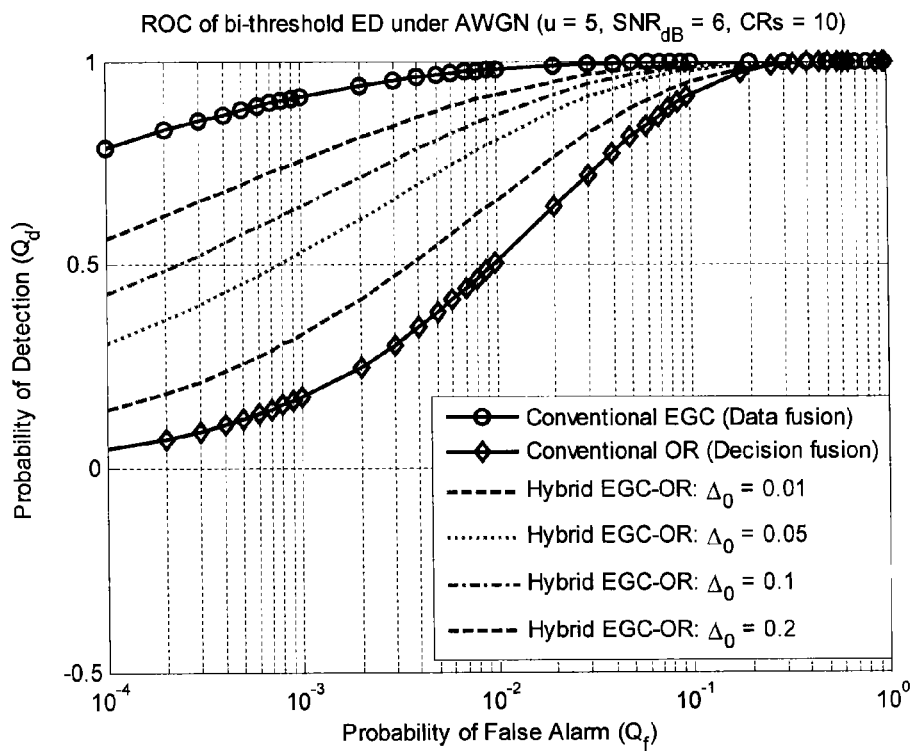
FIG. 26 is a plot showing receiver operating characteristics (ROCs) for the hybrid data-decision fusion method (i.e. EGC-OR method), conventional EGC data fusion method, and conventional OR decision fusion method under additive white Gaussian noise (SNR=6 dB).
Figure 27:
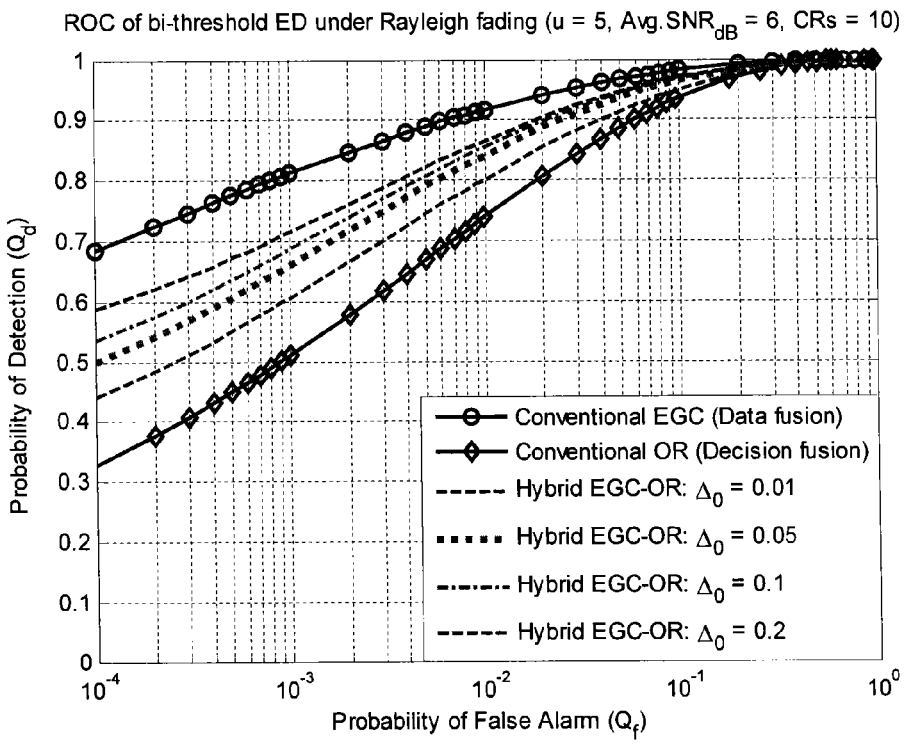
FIG. 27 is a plot showing receiver operating characteristics (ROCs) for the hybrid data-decision fusion method (i.e. EGC-OR method), conventional EGC data fusion method, and conventional OR decision fusion method under Rayleigh fading (SNR=6 dB).

The improved performance offered by the hybrid data-decision fusion method is demonstrated by the ROC curves shown in FIG. 26 and FIG. 27. Shown in these figures are the probability of detection ($Q_d$), and the probability of false-alarm ($Q_f$). Let us start by defining the probability that a given CR receives an energy value in the fuzzy region by $$\Delta_0 = Pr(\lambda_1 < Y < \lambda_2 | H_0) = F_Y(\lambda_2) - F_Y(\lambda_1)$$

and $$\Delta_1 = Pr(\lambda_1 < Y < \lambda_2 | H_1) = G_Y(\lambda_2) - G(\lambda_1),$$

under hypotheses $H_0$ and $H_1$, respectively. The functions $G_Y(.)$ and $F_Y(.)$ are defined as:

$$G_Y(\lambda) = Pr(Y < \lambda | H_1)$$

$$F_Y(\lambda) = Pr(Y < \lambda | H_0).$$

We also define the probability of misdetection $P_m$, the probability of detection $P_d$, and the probability of false-alarm $P_f$, for a single CR as:

$$P_d(\lambda_2) = Pr(Y > \lambda_2 | H_1)$$

$$P_m(\lambda_1) = Pr(Y < \lambda_1 | H_1) = 1 - \Delta_1 - P_d(\lambda_2)$$

$$P_f(\lambda_2) = Pr(Y > \lambda_2 | H_0).$$

The cooperative probability of misdetection, $Q_m$ is given by $$Q_m = Pr(FD = 0 | H_1).$$

The cooperative probability of detection $Q_d$ is readily expressed as:

$$Q_d = 1 - Q_m.$$

On the other hand, we express the cooperative probability of false-alarm ($Q_f$) as:

$$Q_f = Pr(FD = 1 | H_0) = 1 - Pr(FD = 0 | H_0).$$

In order to determine the average communication load over the feedback (reporting) channel, we need first to note that, in any spectrum sensing cycle, the fusion center receives B=[K+ m(N−K)] bits in total (assuming K HDCRs), where m is the number of bits used to send the quantized energy values to the fusion center.

Let us start by defining $T_K$ as the event of having "K cognitive users report hard decisions to the fusion center". The probability of event $T_K$ is just: $Pr(T_K) = (1 - P(\lambda_1 < Y < \lambda_2))^K$. Also define $U_{(N-K)}$ as the event of having "(N−K) users report their energies to the fusion center". The probability of the event $U_{(N-K)}$ can be written as: $Pr(U_{(N-K)}) = P\{\lambda_1 < Y < \lambda_2\}^{(N-K)}$. For simplicity let us use $P_0$ and $P_1$ for $Pr(H_0)$ and $Pr(H_1)$ respectively which represent the probabilities of the primary user being absent and present, respectively. Using the above assumptions, the average number of users reporting their energies can be expressed as:

$$\varphi_{avg} = \sum_{K=0}^{N} (N-K) \left[ \binom{N}{K} Pr(U_{(N-K)} | H_0) Pr(T_K | H_0) \cdot Pr(H_0) + \binom{N}{K} Pr(U_{(N-K)} | H_1) Pr(T_K | H_1) \cdot Pr(H_1) \right] =$$

-continued $$\sum_{K=0}^{N} N\left[\binom{N}{K}Pr(U_{(N-K)} \mid H_0)Pr(T_K \mid H_0) \cdot Pr(H_0) + \binom{N}{K}Pr(U_{(N-K)} \mid H_1)Pr(T_K \mid H_1) \cdot Pr(H_1)\right] -$$

$$\sum_{K=0}^{N} K\left[\binom{N}{K}Pr(U_{(N-K)} \mid H_0)Pr(T_K \mid H_0) \cdot Pr(H_0) + \binom{N}{K}Pr(U_{(N-K)} \mid H_1)Pr(T_K \mid H_1) \cdot Pr(H_1)\right]$$

$$\psi_{avg} = N - \left\{P_0 \sum_{K=1}^{N} K\binom{N}{K}Pr(U_{(N-K)} \mid H_0)Pr(T_K \mid H_0) + P_1 \sum_{K=1}^{N} K\binom{N}{K}Pr(U_{(N-K)} \mid H_1)Pr(T_K \mid H_1)\right\}$$

$$\psi_{avg} = N - K_{avg},$$

where $K_{avg}$ is the average number of CRs with hard decisions C. Sun, W. Zhang, and K. Ben Letaief, "Cooperative Spectrum Sensing for Cognitive Radios under Bandwidth Constraints," in 2007 *IEEE Wireless Communications and Networking Conference*, 2007, pp. 1-5, herein incorporated by reference in its entirety, which can be also expressed as $K_{avg} = P_0 N(1-\Delta_0) + P_1 N(1-\Delta_1) = N[P_0(1-\Delta_0) + P_1(1-\Delta_1)]$.

Once the average number of users with soft decisions, $\psi_{avg}$, is known, the total average number of bits $B_{avg}$ can be expressed as:

$$B_{avg} = K_{avg} + m\psi_{avg}$$
$$= K_{avg} + m(N - K_{avg})$$
$$= K_{avg} + mN - mK_{avg}$$
$$= mN - (m-1)K_{avg}.$$

Finally, the normalized total average number of feedback bits becomes $$\overline{B} = \frac{B_{avg}}{N} = m - (m-1)\overline{K},$$

where $$\overline{K} = \frac{K_{avg}}{N}.$$

From the above expression for $\overline{B}$, we note that the total normalized average number of feedback bits is always less than m. Therefore, in our proposed cooperative spectrum sensing algorithm, the average number of sensing bits is always smaller than that of conventional single-threshold EGC scheme in which every cooperative cognitive user send m bits to the fusion center. Note that, as $\Delta_0 \to 0$ ($\lambda_1$ and $\lambda_2$ coincides), the normalized average number of reporting bits $\overline{B}$ converges to 1, while as $\Delta_0 \to 1$ (distance between $\lambda 1$ and $\lambda_2$ approaches infinity), the normalized average number of reporting bits $\overline{B}$ becomes m, which corresponds to the case of single-threshold EGC. Thus, the hybrid data-decision method offers significant bandwidth savings over the reporting channel compared to the data fusion method using single-threshold EGC.

In summary, the improved method for spectrum sensing using a frequency-domain methods for detecting boundaries between frequency bands and a time-domain method for detecting when frequency bands are occupied creates significant improvements over previous similar methods. These improvements include, performing median filtering in order to smooth PSD $S_r(f)$, and minimize spurious local extrema due to noise. Furthermore, a simple yet effective method for thresholding the noise-wavelet-coefficients has been presented. The targeted spectrum was a wide band spectrum which would require high sampling rates in order to properly characterize the wide band spectrum. However, we could reduce this complexity by inserting guard bands during CR transmission or when the primary goal of the wavelet approach is a rough estimation of spectrum holes. During off-load hours, there will be spectrum-holes even within a specific band $\{B_n\}$. In such a case, the overall operation of the wavelet approach will not be affected negatively, since the wavelet technique will still be able to identify those holes.

For the time domain approach, we proposed a hybrid cooperative spectrum sensing algorithm which combines decision fusion and data fusion techniques using bi-threshold energy detector at the distributed CRs. This hybrid data-decision fusion method, incurs a negligible performance loss compared the EGC data fusion method, but has the relative advantage that the average number of reporting bits dramatically decreases from that of the EGC data fusion method. Therefore, the proposed algorithm reduces the communication burden over the reporting channels as compared to EGC.

Figure 28:
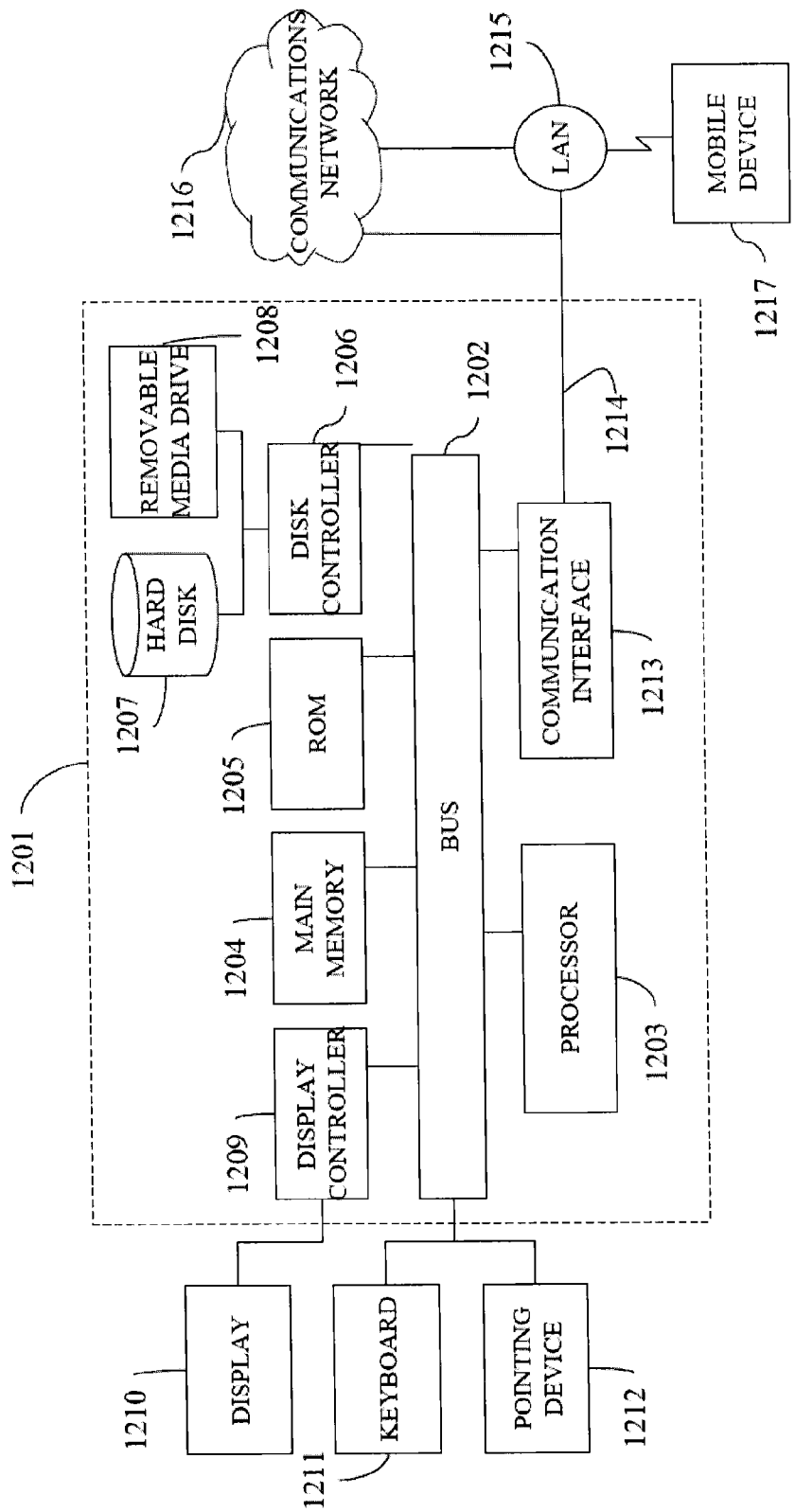
FIG. 28 schematic of the cognitive radio processor for performing calculations and signal processing steps.

Processing digitized signals in either the CRs or in the fusion center may be performed by the apparatus shown in FIG. 28. These processing function include, inter alia, the steps of estimating the PSD, calculating the wavelet smoothing function and its derivatives, performing convolutions, taking absolute values, calculating wavelet transforms and wavelet coefficients, performing data fusion and decision fusion operations, filtering signals, comparing values, demodulating and modulating signals, down-sampling and up-sampling signal, and various other digital signal processing tasks.

Next, a hardware description of the CR processor 22 (shown in FIG. 10) performing functions of processing 23, data fusion 24, and hypothesis testing 25 according to exemplary embodiments is described with reference to FIG. 28. Is discussed previously the FC is a powerful CR, and thus the FC may also use a CR processor to perform processing functions such as data/decision fusion 72, hypothesis testing 73, user selection 74, etc. In FIG. 28, the CR processor includes a CPU 1200 which performs the processes described above. The process data and instructions may be stored in memory 1202. These processes and instructions may also be stored on a storage medium disk 1204 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the CR processor communicates, such as a server or computer.

Further, the claimed advancements may be provided as a utility application, background daemon, or component of an operating system, or combination thereof, executing in conjunction with CPU 1200 and an operating system such as Microsoft Windows 7, UNIX, Solaris, LINUX, Apple MAC-OS and other systems known to those skilled in the art.

CPU 1200 may be a Xenon or Core processor from Intel of America or an Opteron processor from AMD of America, or may be other processor types that would be recognized by one of ordinary skill in the art. Alternatively, the CPU 1200 may be implemented on an FPGA, ASIC, PLD or using discrete logic circuits, as one of ordinary skill in the art would recognize. Further, CPU 1200 may be implemented as multiple processors cooperatively working in parallel to perform the instructions of the inventive processes described above.

The CR processor in FIG. 28 also includes a network controller 1206, such as an Intel Ethernet PRO network interface card from Intel Corporation of America, for interfacing with network of cognitive radio users. As can be appreciated, the network of cognitive radio users can be a public network, such as the Internet, or a private network such as an LAN or WAN network, or any combination thereof and can also include PSTN or ISDN sub-networks. The network of cognitive radio users can also be wired, such as an Ethernet network, or can be wireless such as a cellular network including EDGE, 3G and 4G wireless cellular systems. The wireless network can also be WiFi, Bluetooth, or any other wireless form of communication that is known.

The CR processor further includes a display controller 1208, such as a NVIDIA GeForce GTX or Quadro graphics adaptor from NVIDIA Corporation of America for interfacing with display 1210, such as a Hewlett Packard HPL2445w LCD monitor. A general purpose I/O interface 1212 interfaces with a keyboard and/or mouse 1214 as well as a touch screen panel 1216 on or separate from display 1210. General purpose I/O interface also connects to a variety of peripherals 1218 including printers and scanners, such as an OfficeJet or DeskJet from Hewlett Packard.

A sound controller 1220 is also provided in the CR processor, such as Sound Blaster X-Fi Titanium from Creative, to interface with speakers/microphone 1222 thereby providing sounds and/or music.

The general purpose storage controller 1224 connects the storage medium disk 1204 with communication bus 1226, which may be an ISA, EISA, VESA, PCI, or similar, for interconnecting all of the components of the CR processor. A description of the general features and functionality of the display 1210, keyboard and/or mouse 1214, as well as the display controller 1208, storage controller 1224, network controller 1206, sound controller 1220, and general purpose I/O interface 1212 is omitted herein for brevity as these features are known.

In one embodiment of the method for spectrum sensing the first step is to determine within a wide band of interest narrower frequency bands allocated to primary users. This discrimination of allocated frequency bands relies on a wavelet transform frequency domain method. It is only after narrower frequency bands have been resolved, that the time domain method operates on these narrower frequency bands to decide whether the narrower frequency bands are available to cognitive radio users. Thus, the time domain method does not evaluate the entire wide band of interest as a whole, but only evaluates partitions, one at a time, within the wide band of interest.

In one embodiment of the method, the received signal for the wide band of interest is analyzed using statistical correlation and Fourier transform relations converting the signal to its power spectral density (PSD) representation. In order to remove the thermal noise (Gaussian noise) effect from the calculated PSD, median filtering is applied to the received signal's PSD before calculating the wavelet transform coefficients.

In one embodiment of the method, wavelet coefficients with different scales are combined using a multi-scale sum method. Also, the effects of Gaussian noise are minimized by defining a threshold, and setting all wavelet coefficients less than the threshold to zero.

In one embodiment of the method, the method only uses "blind techniques" that do not require prior information, including prior information of the primary users' frequency bands, modulation scheme, etc.

In one embodiment of the method, when the received energy for a frequency band falls between the two thresholds of a bi-threshold detector, equal gain combining (EGC) is used at a fusion center, where the fusion center makes a decision about whether the frequency band is available to cognitive radio users.

The thesis titled "Spectrum Sensing in Time and Frequency Domains", written and defended by Humayun Khalid Y. Kathuria, for the degree of Master of Science in Telecommunication Engineering at King Fand University of Petroleum & Minerals, and dated December 2012, is herein incorporated by reference in its entirety.

Obviously, numerous modifications and variations of the present invention are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A method for spectrum sensing for cognitive radio, the method comprising:
   receiving a time-domain signal of a cognitive radio user;
   estimating a power spectral density of the time-domain signal;
   calculating wavelet transform coefficients at one or more scale factors by convolving the power spectral density with a first derivative of a wavelet smoothing function;
   obtaining a positive signal by taking an absolute value of the wavelet transform coefficients, and if more than one wavelet scale factor is used, combining the wavelet transform coefficients of different scale factors;
   detecting frequency-band edges of the power spectral density by solving for peak frequencies, wherein the peak frequencies are frequencies of a local maxima of the positive signal;
   defining a plurality of frequency bands, wherein each frequency band of the plurality of frequency bands includes a respective set of frequencies between nearest neighbor pairs of the frequency-band edges;
   determining a received energy value for a first frequency band of the plurality of frequency bands;
   comparing the received energy value to energy thresholds using a bi-threshold energy detector that signals a hard decision using a binary number when the received energy value is within a first set of received energy values, and signals a soft decision using a rational number when the received energy value is within a second set of received energy values; and signaling an availability of the first frequency band based on the comparison performed by the bi-threshold energy detector, wherein the energy thresholds include a first energy threshold and a second energy threshold;

the second energy threshold is greater than the first energy threshold;

the bi-threshold energy detector generates a signal value representing either the hard decision or the soft decision when the received energy value is respectively within the first set or the second set of the received energy values;

the soft decision is signaled when the received energy value is within the second set of received energy values, and the second set of received energy values includes a range of values less than the second energy threshold and greater than the first energy threshold;

when the received energy value is in the range between the first energy threshold and second energy threshold, the bi-threshold energy detector signals the soft decision using the signal value that is a rational number proportional to the received energy value;

the hard decision is signaled when the received energy value is within the first set of received energy values, and the first set of received energy values includes a range of values less than the first energy threshold and another range of values greater than the second energy threshold;

when the received energy value is greater than the second energy threshold, the bi-threshold detector signals the hard decision using the signal value that is a binary one; and when the received energy value is less than the first energy threshold, the bi-threshold detector signals the hard decision using the signal value that is a binary zero.

2. The method according to claim 1, wherein the signaling of the availability of the first frequency band is performed by a fusion center making a final decision regarding the availability of the first frequency band based on received signal values of bi-threshold energy detectors of a cooperative network of a plurality of cognitive radio users that includes the cognitive radio user, wherein the final decision regarding the availability of the first frequency band is performed by receiving at the fusion center the signal values of the cooperative network of cognitive radio users;

processing the signal values corresponding to soft decisions from the plurality of cognitive radio users to obtain a cooperative soft decision regarding the availability of the first frequency band;

processing the signal values corresponding to hard decisions from the plurality of cognitive radio users to obtain a cooperative hard decision regarding the availability of the first frequency band;

making the final decision that the first frequency band is available if the cooperative hard decision indicates the first frequency band is available and the cooperative soft decision indicates the first frequency band is available, and otherwise making the final decision that the first frequency band is not available; and transmitting the final decision to the plurality of cognitive radio users in the cooperative network of cognitive radio users.

3. The method according to claim 2, wherein the cooperative soft decision is performed by:

linear combining the signal values of the cooperative network of cognitive radio users corresponding to soft decisions to generate a linear combination of soft-decision signal values and comparing the linear combination of soft-decision signal values to a soft-decision threshold; and making the cooperative soft decision that the first frequency band is not available, if the linear combination of soft-decision signal values is greater than the soft-decision threshold, otherwise making the cooperative soft decision that the first frequency band is available.

4. The method according to claim 2, wherein the processing of hard decisions is performed by:

making the cooperative hard decision that the frequency band is available, if all of the signal values corresponding to the hard decisions of the cooperative network of cognitive users indicate that the first frequency band is available, otherwise making the cooperative hard decision that the first frequency band is not available.

5. The method according to claim 4, wherein the cooperative soft decision is performed by:

linear combining the signal values of the cooperative network of cognitive radio users corresponding to soft decisions to generate a linear combination of soft-decision signal values and comparing the linear combination of soft-decision signal values to a soft-decision threshold; and making the cooperative soft decision that the first frequency band is not available, if the linear combination of soft-decision signal values is greater than the soft-decision threshold, otherwise making the cooperative soft decision that the first frequency band is available.

* * * * *